US011216935B2

(12) United States Patent
Cho et al.

(10) Patent No.: US 11,216,935 B2
(45) Date of Patent: Jan. 4, 2022

(54) VISION INSPECTION MANAGEMENT METHOD AND SYSTEM INSPECTING BASED ON PROCESS DATA

(71) Applicant: Samsung Electronics Co., Ltd., Suwon-si (KR)

(72) Inventors: Chihyun Cho, Suwon-si (KR); Changbae Yoon, Suwon-si (KR); Jinguk Jeong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 149 days.

(21) Appl. No.: 16/257,667

(22) Filed: Jan. 25, 2019

(65) Prior Publication Data

US 2019/0236772 A1 Aug. 1, 2019

(30) Foreign Application Priority Data

Jan. 31, 2018 (KR) ........................ 10-2018-0012343

(51) Int. Cl.
*G06T 7/00* (2017.01)
*G06N 3/08* (2006.01)
*G06N 20/00* (2019.01)

(52) U.S. Cl.
CPC ............. *G06T 7/0008* (2013.01); *G06N 3/08* (2013.01); *G06N 20/00* (2019.01); *G06T 7/001* (2013.01); *G06T 7/0004* (2013.01); *G06T 2207/10004* (2013.01); *G06T 2207/20016* (2013.01); *G06T 2207/20081* (2013.01); *G06T 2207/20084* (2013.01); *G06T 2207/30164* (2013.01)

(58) Field of Classification Search
None
See application file for complete search history.

(56) References Cited

U.S. PATENT DOCUMENTS

| 6,886,153 B1 | 4/2005 | Bevis |
| 7,333,650 B2* | 2/2008 | Yamamoto ........... G06K 9/3233 |
| | | 382/145 |

(Continued)

FOREIGN PATENT DOCUMENTS

| JP | 2004-191112 A | 7/2004 |
| JP | 2014-109530 A | 6/2014 |

(Continued)

OTHER PUBLICATIONS

International Search Report dated May 10, 2019, issued in an International application No. PCT/KR2019/001169.

(Continued)

*Primary Examiner* — Tahmina N Ansari
(74) *Attorney, Agent, or Firm* — Jefferson IP Law, LLP

(57) ABSTRACT

A method, performed by a process management apparatus, of managing vision inspection using an artificial intelligence (AI) model and an apparatus therefor are provided. The method includes obtaining first process data related to a first manufacturing process through which a first object passes, identifying a first region on which intensive inspection is to be performed in an entire region of the first object using the AI model and the first process data, controlling a first vision inspector to inspect the identified first region, and determining whether a defect is present in the identified first region.

21 Claims, 17 Drawing Sheets

(56) References Cited

U.S. PATENT DOCUMENTS

| | | | |
|---|---|---|---|
| 2015/0039245 A1 | 2/2015 | Langlois et al. | |
| 2016/0033420 A1 | 2/2016 | Baris et al. | |
| 2017/0151634 A1 | 6/2017 | Witney | |
| 2018/0293806 A1* | 10/2018 | Zhang | G06T 7/0008 |

FOREIGN PATENT DOCUMENTS

| | | |
|---|---|---|
| KR | 10-2000-0058836 A | 10/2000 |
| KR | 10-2017-0007938 A | 1/2017 |
| KR | 10-1697119 B1 | 1/2017 |
| KR | 10-2017-0062574 A | 6/2017 |
| KR | 10-1743477 B1 | 6/2017 |
| WO | 2017200524 A1 | 11/2017 |
| WO | 2018006180 A1 | 1/2018 |

OTHER PUBLICATIONS

European Search Report dated Aug. 12, 2020 issued in European Application No. 19747778.9.

\* cited by examiner

FIG. 6

| VISION INSPECTION TYPE (610) | INSPECTION LEVEL (620) | |
|---|---|---|
| BASIC INSPECTION (611) | 2D IMAGE ANALYSIS WITH RESPECT TO ENTIRE REGION | |
| INTENSIVE INSPECTION (612) | Level 1 | 2D IMAGE ANALYSIS WITH RESPECT TO SPECIFIC REGION |
| | Level 2 | HIGH RESOLUTION 2D IMAGE ANALYSIS WITH RESPECT TO SPECIFIC REGION |
| | Level 3 | 3D IMAGE ANALYSIS WITH RESPECT TO SPECIFIC REGION |
| | Level 4 | HIGH RESOLUTION 3D IMAGE ANALYSIS WITH RESPECT TO SPECIFIC REGION |

VISION INSPECTION MANAGEMENT METHOD AND SYSTEM INSPECTING BASED ON PROCESS DATA

CROSS-REFERENCE TO RELATED APPLICATION(S)

This application is based on and claims priority under 35 U.S.C. § 119 of a Korean patent application number 10-2018-0012343, filed on Jan. 31, 2018, in the Korean Intellectual Property Office, the disclosure of which is incorporated by reference herein in its entirety.

BACKGROUND

1. Field

The disclosure relates to an artificial intelligence (AI) system that simulates functions of recognition, judgment, etc. of the human brain by utilizing a machine learning algorithm such as deep learning, etc. and its application. More particularly, the disclosure relates to a vision inspection management method and system using an AI model.

2. Description of Related Art

An artificial intelligence (AI) system is a computer system that implements human level intelligence. Unlike an existing rule based smart system, the AI system is a system that trains autonomously, decides, and becomes increasingly smarter. The more the AI system is used, the more the recognition rate of the AI system may improve and the AI system may more accurately understand a user preference, and thus, an existing rule based smart system being gradually replaced by a deep learning based AI system.

AI technology refers to machine learning (deep learning) and element technologies that utilize the machine learning.

Machine learning is an algorithm technology that classifies/learns the features of input data autonomously. Element technology is a technology that consists of technical fields such as linguistic understanding, visual comprehension, reasoning/prediction, knowledge representation, and motion control.

AI technology is applied to various fields such as linguistic understanding, which is a technology to recognize and apply/process human language/characters and includes natural language processing, machine translation, dialogue systems, query response, speech recognition/synthesis, and the like, visual comprehension, which is a technology to recognize and process objects like human vision and includes object recognition, object tracking, image search, human recognition, scene understanding, spatial understanding, image enhancement, and the like, reasoning prediction, which is a technology to obtain and logically infer and predict information and includes knowledge/probability based reasoning, optimization prediction, preference based planning, recommendation, etc., knowledge representation, which is a technology to automate human experience information into knowledge data and includes knowledge building (data generation/classification), knowledge management (data utilization), etc., motion control, which is a technology to control autonomous traveling of a vehicle and motion of a robot, and includes motion control (navigation, collision avoidance, and traveling), operation control (behavior control), etc., and the like.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a vision inspection management method of increasing the efficiency of vision inspection by intensively performing vision inspection on a specific area of an object using an artificial intelligence (AI) model and processing data, and a processing management apparatus therefor.

Additional aspects will be set forth in part in the description which follows and, in part, will be apparent from the description, or may be learned by practice of the presented embodiments.

In accordance with an aspect of the disclosure, a method, performed by a process management apparatus, of managing vision inspection using an artificial intelligence (AI) model is provided. The method includes obtaining first process data related to a first manufacturing process through which a first object passes, identifying a first region on which intensive inspection is to be performed in an entire region of the first object using the AI model and the first process data, and controlling a first vision inspector to inspect the identified first region, and determining whether a defect is present in the identified first region.

In accordance with another aspect of the disclosure, a process management apparatus is provided. The process management apparatus includes a memory for storing an artificial intelligence (AI) model configured to determine an intensive inspection region, a communication interface configured to obtain first process data related to a first manufacturing process through which a first object passes, and at least one processor configured to identify a first region on which intensive inspection is to be performed in an entire region of the first object using the AI model and the first process data, control a first vision inspector to inspect the identified first region, and determine whether a defect is present in the identified first region.

In accordance with another aspect of the disclosure, a computer program product is provided. The computer program product includes a non-transitory computer readable recording medium having recorded thereon a plurality of instructions that instruct at least one processor to perform: obtaining first process data related to a first manufacturing process through which a first object has passed, identifying a first region on which intensive inspection is to be performed in an entire region of the first object using an AI model and the first process data, controlling a first vision inspector to inspect the identified first region, and determining whether a defect is present in the identified first region.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram for explaining an inspection level according to an embodiment of the disclosure;

Throughout the drawings, it should be noted that like reference numbers are used to depict the same or similar elements, features, and structures.

DETAILED DESCRIPTION

Figure 1:
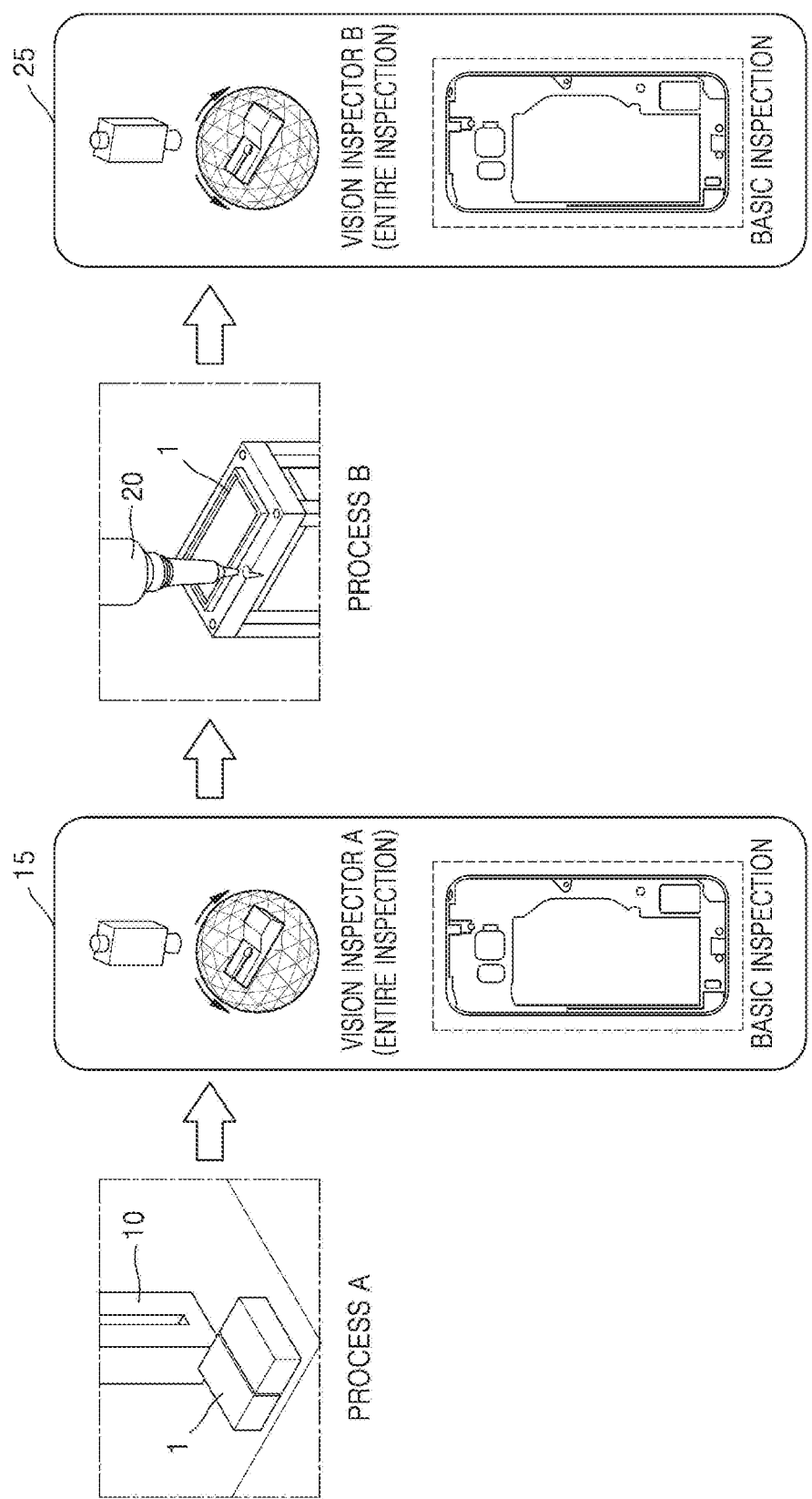
FIG. 1 is a diagram for explaining a general vision inspection system.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are selected from among common terms that are currently widely used in consideration of their functions in the disclosure. However, the terms may be different according to the intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

Throughout the present specification, when a part "includes" an element, it is to be understood that the part additionally includes other elements rather than excluding other elements as long as there is no particular opposing recitation. Also, the terms such as " . . . unit", "module", or the like used in the present specification indicate a unit, which processes at least one function or motion, and the unit may be implemented by hardware or software, or by a combination of hardware and software.

In the present specification, a vision inspection refers to inspection of automatically reading a product defect using a computer-based camera image processing technology. According to an embodiment, the vision inspection may be applied to various fields such as inspection, product classification, impurity inspection, missing inspection, packaging defect inspection, etc. but is not limited thereto.

Embodiments of the disclosure will be described in detail in order to fully convey the scope of the disclosure and enable one of ordinary skill in the art to embody and practice the disclosure. The disclosure may, however, be embodied in many different forms and should not be construed as being limited to the embodiments set forth herein. Also, parts in the drawings unrelated to the detailed description are omitted to ensure clarity of the disclosure. Like reference numerals in the drawings denote like elements.

Throughout the disclosure, the expression "at least one of a, b or c" indicates only a, only b, only c, both a and b, both a and c, both b and c, all of a, b, and c, or variations thereof.

FIG. 1 is a diagram for explaining a general vision inspection system.

With regard to a manufacturing process of a product, vision inspection may be sequentially performed after each manufacturing process. For example, in a process of manufacturing a case product 1, vision inspection A 15 may be performed after a process A (e.g., by a first equipment device 10), and vision inspection B 25 may be performed after a process B (e.g., by a second equipment device 20).

A vision inspector A may capture a whole image of the case product 1 to determine whether the case product 1 passed through the process A, by the first equipment device 10, has a defect. The vision inspector A may analyze the whole image of the case product 1 to determine whether an appearance as a defect. Further, a vision inspector B may capture a whole image of the case product 1 to determine whether the case product 1 passed through a process B, by the second equipment device 20, as a defect. The vision inspector B may analyze the whole image of the case product 1 to determine whether an appearance as a defect. That is, although the process A (performed by the first equipment device 10) and the process B (performed by the second equipment device 20) are different processes, because an operation of the vision inspector A performed after the process A (performed by the first equipment device 10) and an operation of the vision inspector B performed after the process B (performed by the second equipment device 20) are the same, a detailed inspection of a part on which operation is performed in each process, and duplicate inspection may be performed.

Therefore, there is a need for a system that allows optimized vision inspection to be performed on the part on which operation is performed in each process. A vision inspection system for performing optimized vision inspection will be described in detail with reference to FIG. 2.

Figure 2:
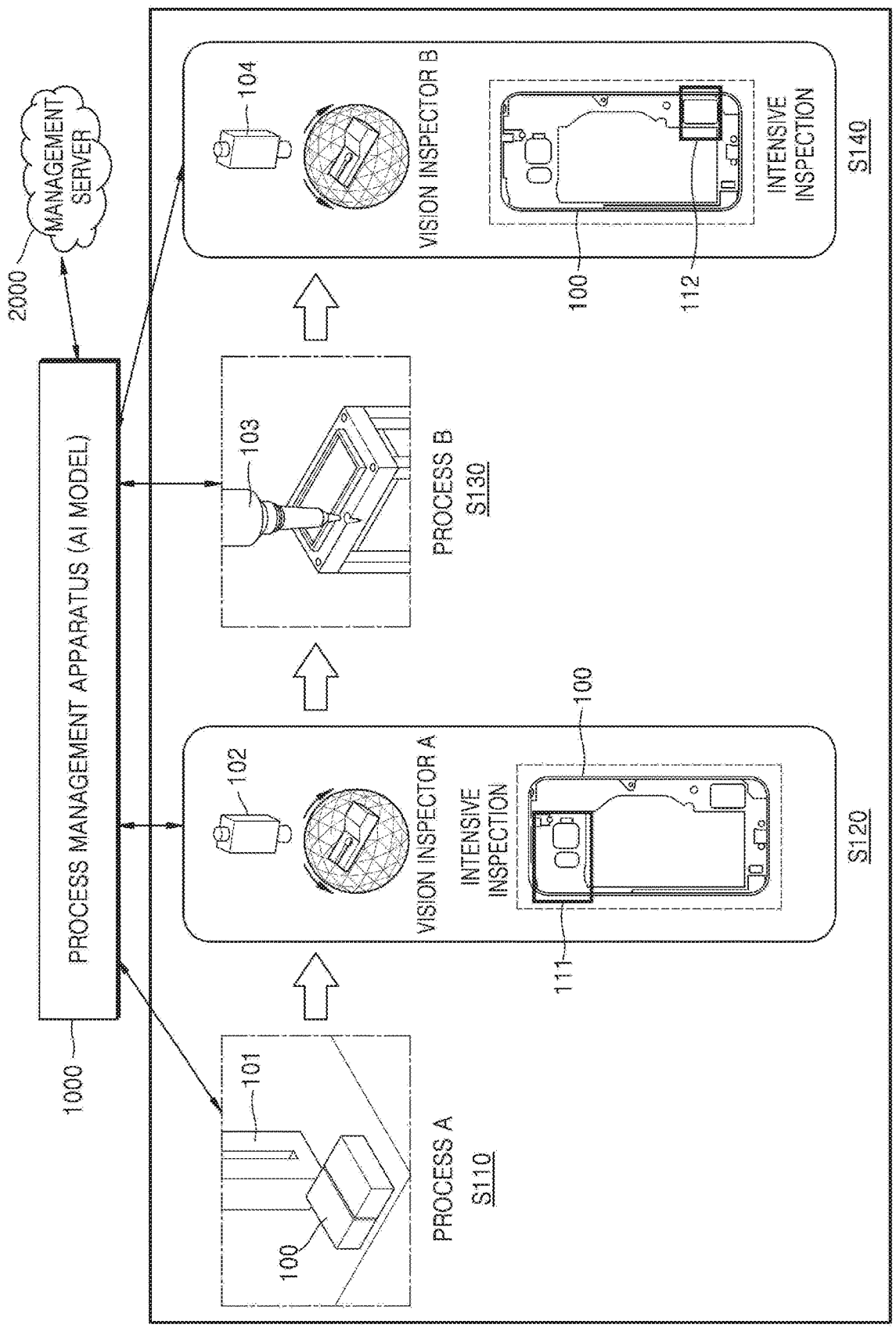
FIG. 2 is a diagram for explaining a vision inspection system according to an embodiment of the disclosure.

FIG. 2 is a diagram for explaining a vision inspection system according to an embodiment of the disclosure.

Referring to FIG. 2, the vision inspection system according to an embodiment of the disclosure may include at least one process equipment (e.g., a first process equipment 101 and a second equipment 103), at least one vision inspector (e.g. a vision inspector A 102 and a vision inspector B 104), a process management apparatus 1000, and a management server 2000. However, all illustrated configurations are not indispensable. For example, the vision inspection system may be implemented as by at least one process equipments 101 and 103, at least one vision inspectors 102 and 104, and the process management apparatus 1000 without the management server 2000. The vision inspection system may include at least one edge computer (not shown) in addition to the at least one process equipments 101 and 103, the at least one vision inspectors 102 and 104, the process management apparatus 1000, and the management server 2000. The edge computer (not shown) may collect data from the at least one process equipments 101 and 103, the at least one vision inspectors 102 and 104, or at least one environment sensor, filter the collected data, and then transmit the filtered data to the process management apparatus 1000 or the management server 2000. The edge computer will be described later in detail with reference to FIG. 14.

The at least one process equipments 101 and 103 may be used in a process of manufacturing a product and may vary such as a thermoforming equipment, a cutting equipment, a press molding equipment, an injection molding equipment, a nano processor, a die casting equipment, a laser marking equipment, a computer numerical control (CNC) equipment, a polishing equipment, a coating equipment, a stamping process equipment, a bonding equipment, an assembly equipment, etc., but it is not limited thereto.

According to an embodiment, the at least one process equipments 101 and 103 may include a communication interface for performing communication with an external device. According to an embodiment, the at least one process equipments 101 and 103 may communicate with the process management apparatus 1000 through the communication interface. The communication interface may include a short-range wireless communication unit, a mobile communication unit, and the like. The short-range wireless communication unit may include a Bluetooth communication unit, a Bluetooth low energy (BLE) communication unit, a near field communication unit, a wireless local area network (WLAN) communication unit, a WLAN (WiFi) communication unit, a Zigbee communication unit, an infrared data association (IrDA) communication unit, a Wi-Fi direct (WFD) communication unit, an ultra wideband (UWB) communication unit, an Ant+ communication unit, etc., but it is not limited thereto. The mobile communication unit may transmit and receive a radio signal to and from at least one of a base station, an external terminal, or a server over a mobile communication network.

According to an embodiment, the at least one process equipments 101 and 103 may transmit process data to the process management apparatus 1000. At this time, the at least one process equipments 101 and 103 may transmit the process data to the process management apparatus 1000 through the edge computer (not shown) or may directly transmit the process data to the process management apparatus 1000 (not shown) without the edge computer (not shown). Meanwhile, the at least one process equipments 101 and 103 may receive a control signal from the process management apparatus 1000. In this case, the at least one processing equipments 101 and 103 may operate according to the received control signal.

According to an embodiment, the at least one process equipments 101 and 103 may communicate with the at least one vision inspectors 102 and 104 through the communication interface. In this case, the at least one process equipments 101 and 103 may transmit the process data to the at least one vision inspectors 102 and 104, or may transmit a notification signal indicating that an abnormal signal has been detected during a process procedure.

The at least one vision inspectors 102 and 104 may be devices including a high performance camera, a lens, illumination, an image processor, and the like. The at least one vision inspectors 102 and 104 may obtain an image of an object 100 that is a target of vision inspection using a camera, a lens, and illumination, analyze the obtained image, and perform a specific operation (e.g. a defect inspection, etc.). For example, the at least one vision inspectors 102 and 104 may be perform defect detection (e.g., a crack, impurity, stain, damage, etc.), parts classification, pattern matching, dimension measurement (e.g. size, angle, and area), color inspection (e.g., color analysis and color matching), number counting, surface finish inspection, and the like.

According to an embodiment, the at least one vision inspectors 102 and 104 may obtain a two-dimensional (2D) image of the object 100, analyze the obtained 2D image, and perform the specific operation (e.g., the defect inspection, etc.) Also, the at least one vision inspectors 102 and 104 may obtain a three-dimensional (3D) image of the object 100, analyze the obtained 3D image, and perform the specific operation (e.g., the defect inspection, etc.)

On the other hand, the at least one vision inspectors 102 and 104 may obtain a high resolution image having a resolution larger than a first threshold value, or a low resolution image having a resolution lower than a second threshold value.

According to an embodiment, the at least one vision inspectors 102 and 104 may include a communication interface for communicating with an external device. According to an embodiment, the at least one vision inspectors 102 and 104 may communicate with the process management apparatus 1000 through the communication interface. The communication interface may include a short-range wireless communication unit, a mobile communication unit, and the like, but is not limited thereto.

For example, the at least one vision inspectors 102 and 104 may receive a control signal from the process management apparatus 1000. The at least one vision inspectors 102 and 104 may perform vision inspection according to the received control signal. The at least one vision inspectors 102 and 104 may transmit vision inspection result data to the process management apparatus 1000 through the communication interface. At this time, the at least one vision inspectors 102 and 104 may transmit the vision inspection result data to the process management apparatus 1000 through an edge computer (not shown) or may directly transmit the vision inspection result data to the process management apparatus 1000 without the edge computer (not shown).

The process management apparatus 1000 may store an artificial intelligence model (hereinafter referred to as an AI model) for identifying a region on which intensive inspection (hereinafter referred to as an intensive inspection region) is to be performed. The intensive inspection region may be a region where a defect occurrence probability is high. The AI model may be a learned model according to at least one of machine learning, neural network or deep learning algorithm. The process management apparatus 1000 may use the process data and the AI model received from the at least one process equipments 101 and 103 to identify the intensive inspection region. For example, the process management apparatus 1000 may input (or apply) data about the process A (in operation S110) received from the first process equipment 101 to the AI model to determine a top left region 111 as the intensive inspection region. Also, the process management apparatus 1000 may input (or apply) data about the process B (in operation S130) received from the second equipment 103 to the AI model to determine a bottom right region 112 of the object 100 as the intensive inspection region. At this time, in the case of the object 100 that has passed through the process A, the defect occurrence probability may be high in the top left region 111 of the object 100, and in the case of the object 100 that has passed the process B, the defect occurrence probability may be high in the bottom right region 112 of the object 100.

According to an embodiment, the process management apparatus 1000 may transmit information about the intensive inspection region to the at least one vision inspectors 102 and 104. For example, the process management apparatus 1000 may transmit a control signal to the vision inspector A 102 to perform intensive inspection on the top left region 111 of the object 100. In this case, the vision inspector A 102 may perform vision inspection on the top left region 111 of the object 100 with a more precise intensity than a basic inspection (in operation S120). The process management apparatus 1000 may also transmit a control signal to the vision inspector B 104 to perform intensive inspection on the bottom right region 112 of the object 100. In this case, the vision inspector B 104 may perform vision inspection on the bottom right region 112 of the object 100 with a more precise intensity than the basic inspection (at operation S140). Accordingly, the vision inspection system according to an embodiment of the disclosure may enable optimized vision inspection to be performed on the part on which operation is performed in each process.

An operation of efficiently managing vision inspection in which the process management apparatus 1000 identifies the intensive inspection region based on the process data and the AI model and transmits information (e.g., coordinate values) about the intensive inspection region to the at least one vision inspectors 102 and 104 will be described later in detail with reference to FIG. 4.

According to an embodiment, the management server 2000 may include an AI processor. The AI processor may train an artificial neural network and generate an AI model that identifies the intensive inspection region. 'Training' the artificial neural network may mean generating a mathematical model capable of making an optimal decision by connecting neurons constituting the artificial neural network while changing weights appropriately based on data.

Figure 3:
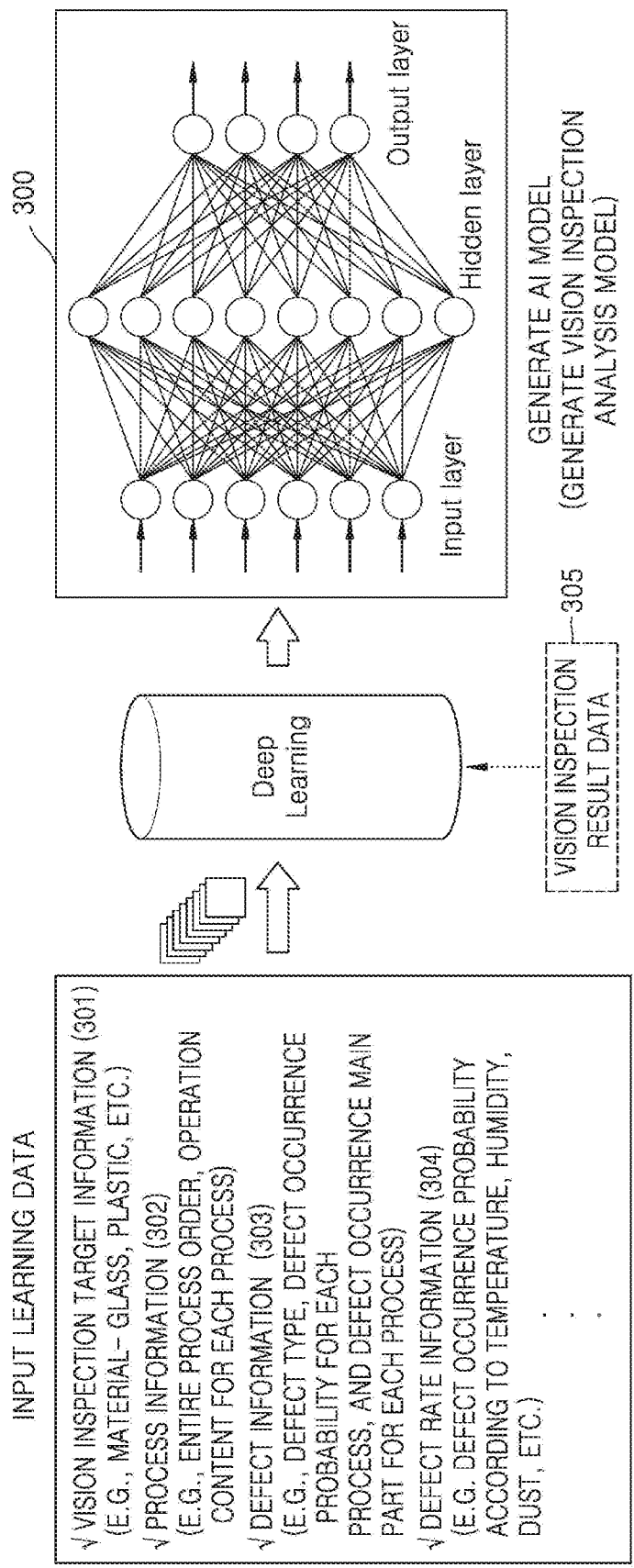
FIG. 3 is a diagram for explaining an operation of training an artificial intelligence (AI) model, according to an embodiment of the disclosure.

FIG. 3 is a diagram for explaining an operation of training an AI model, according to an embodiment of the disclosure.

Referring to FIG. 3, the AI processor of the management server 2000 may obtain vision inspection target information 301, process information 302, defect information 303, and defect rate information 304 according to the surrounding environment from the outside (e.g., an operator) as learning data (training data). At this time, the AI processor may input the vision inspection target information 301, the process information 302, the defect information 303, and the defect rate information 304 according to the surrounding environment to a deep learning algorithm to generate an AI model 300 that identifies the intensive inspection region. For example, the AI model 300 may receive the vision inspection target information 301, the process information 302, the defect information 303, and the defect rate information 304 according to the surrounding environment to learn for itself based on the received vision inspection target information 301, process information 302, defect information 303, and defect rate information 304 according to the surrounding environment.

The vision inspection target information 301 may be information about a material (e.g., glass, plastic, aluminum, rubber, vinyl, fiber, food, etc.) of a manufactured product.

The process information 302 may be information about a process of manufacturing a product, and may include, for example, information about an order of an entire processes, information (e.g., equipment for performing a process, an operation part, an operation type, etc.) about content of each process, context information (e.g., vibration, heat, dust, water vapor, etc.) generated in each process, but is not limited thereto.

The defect information 303 may include information about a kind of a defect (e.g., crack, impurity, stain, or damage), information about a defect occurrence probability per process (e.g., the process A is 1.5%, the process B is 0.5%, etc.), information about a defect occurrence main part (e.g., an outer circumferential surface in the process A, a hole in the process B, a support in the process C, etc.), but is not limited thereto. The defect information 303 may include a defect image. The defect image may be a 2D image or a 3D image. Also, the defect image may be a still image or a moving image.

The defect rate information 304 according to the surrounding environment may be information about a defect occurrence probability according to an environment (e.g., temperature, humidity, dust, etc.) around the process equipment. For example, the defect rate information 304 according to the surrounding environment may include information indicating that the defect occurrence probability increases by 0.2% every time a surrounding temperature rises by 1° C., the defect occurrence probability is 1.3% when humidity is 70%, the defect occurrence probability is 1% when humidity is 60%, but is not limited thereto.

According to an embodiment, the AI processor may model coordinate values of the intensive inspection region according to the process data by matching the process data (the vision inspection target information 301 and the process information 302) with the defect data (the defect information 303 and the defect rate information 304 according to the surrounding environment).

Meanwhile, the AI processor may generate learning images by rotating a subject included in the obtained defect image by a predetermined angle. For example, the AI processor may generate a first learning image in which the subject (e.g., a product) included in the defect image is rotated 30 degrees to the left, a second learning image in which the subject is rotated 50 degrees to the left, a third leaning image in which the subject is rotated 70 degrees to the left, a fourth learning image in which the subject is rotated 30 degrees to the right, a fifth learning image in which the product is rotated 50 degrees to the right, a sixth learning image in which the product is rotated 70 degrees to the right, and a seventh learning image in which the subject is bilaterally symmetrically transformed.

According to an embodiment, the AI processor may obtain vision inspection result data 305. The vision inspection result data 305 may be data of a result of actually performing vision inspection in the at least one vision inspectors 102 and 104, and may include, for example, whether a defect occurs, information about a defect occurrence site, a defect image, etc., but is not limited thereto. The AI processor may adaptively generate the AI model 300 capable of determining the optimal intensive inspection region by inputting the vision inspection result data 305 to the deep learning algorithm as learning data (training data).

According to an embodiment, the management server 2000 may include a communication interface for performing communication with an external device. For example, the management server 2000 may communicate with the process management apparatus 1000, the at least one process equipment 101 and 103, or the at least one vision inspectors 102 and 104 via the communication interface.

According to an embodiment, the management server 2000 may transmit the AI model 300 to the process management apparatus 1000. The management server 2000 may transmit the AI model 300 to the process management apparatus 1000 or may transmit the AI model 300 to the process management apparatus 1000 at a predetermined period when there is a request from the process management apparatus 1000. Also, when an event that the AI model 300 is modified and refined occurs, the management server 2000 may transmit the modified and refined AI model 300 to the process management apparatus 1000. In this case, the process management apparatus 1000 may modify and refine or change an old version of the AI model 300 to a latest version of the AI model 300 by comparing versions of the previously stored AI model 300 with the received AI model 300.

Meanwhile, the AI model 300 is generated or learned by the management server 2000 in FIG. 2, but is not limited thereto. For example, the AI model 300 may be generated or learned by the process management apparatus 1000.

Also, the process management apparatus 1000 may store the AI model 300 in FIG. 2, but is not limited thereto. For example, instead of the process management apparatus 1000, the AI model 300 may be stored in the management server 2000. In this case, the process management apparatus 1000 may receive the process data from the at least one process equipment 101 and 103 and transmit the received process data to the management server 2000 to request information about the intensive inspection region. The management server 2000 may apply the process data to the AI model 300 to identify the intensive inspection region and transmit information (e.g., coordinate information) about the identified intensive inspection region to the process management apparatus 1000. The process management apparatus 1000 may transmit information about the intensive inspection region to the at least one vision inspectors 102 and 104.

Hereinafter, a method performed by the process management apparatus 1000 of efficiently managing a vision inspection using the AI model 300 will be described in more detail with reference to FIG. 4.

Figure 4:
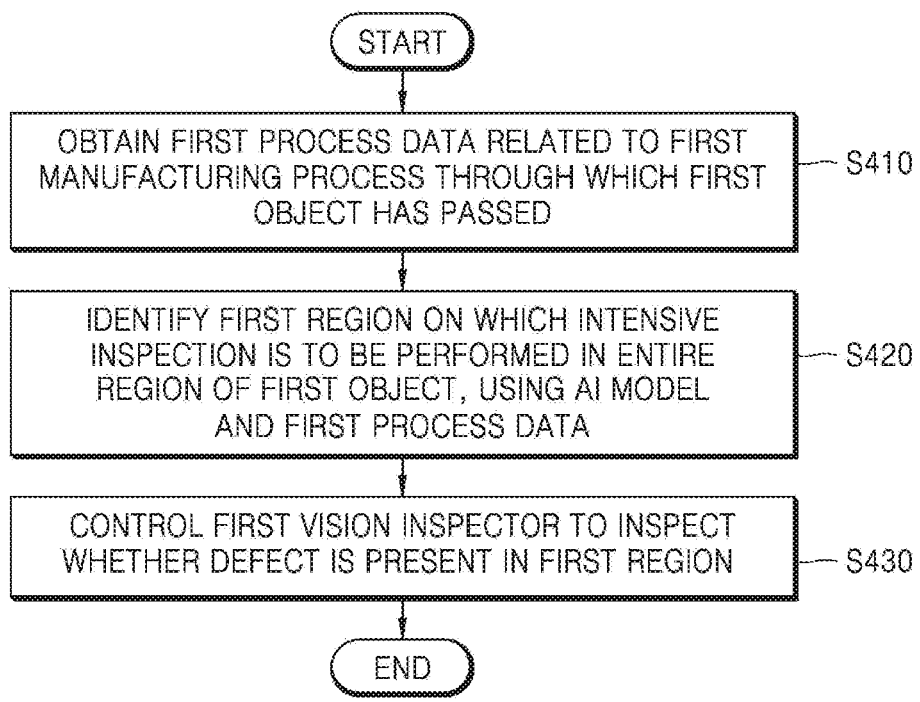
FIG. 4 is a flowchart illustrating a method of managing vision inspection, according to an embodiment of the disclosure.

FIG. 4 is a flowchart illustrating a method of managing a vision inspection according to an embodiment of the disclosure.

In operation S410, the process management apparatus 1000 may obtain first process data related to a first manufacturing process through which a first object has passed.

According to an embodiment, the first process data may include information about a first process equipment that performs the first manufacturing process, information about a part or content of an operation performed in the first manufacturing process, information about an order of the first manufacturing process during an entire process, information about a defect rate occurring in the first manufacturing process, and context information generated in the first manufacturing process, but is not limited thereto. Also, the context information generated in the first manufacturing process may include information about vibration, heat, dust, water vapor, and the like, but is not limited thereto.

According to an embodiment, the process management apparatus 1000 may receive the first process data from the first process equipment that performs the first manufacturing process. For example, the first process equipment may transmit the first process data obtained while the first object passes through the first manufacturing process to the process management apparatus 1000 over a wired/wireless network. According to an embodiment, the process management apparatus 1000 may receive the first process data directly from the first process equipment, and may receive the first process data from an edge computer connected to the first process equipment. The first process equipment may transmit the first process data related to an object to the process management apparatus 1000 every time objects pass through.

In operation S420, the process management apparatus 1000 may identify a first region on which intensive inspection is to be performed in an entire region of the first object, using the AI model 300 and the first process data. That is, the process management apparatus 1000 may determine the first region of the first object as an intensive inspection region. The intensive inspection region may be a region having a high defect occurrence probability.

According to an embodiment, when the process management apparatus 1000 inputs the first process data to the AI model 300, the AI model 300 may determine the intensive inspection region based on the first process data. For example, when the first manufacturing process is a process of cutting a top right end of the first object, the AI model 300 may determine the top right end as the first region on which intensive inspection is to be performed. When the first manufacturing process is a thermoforming process and a crack occurrence probability at a center portion is high after the thermoforming process, the AI model 300 may determine a center region of the first object as the first region on which intensive inspection is to be performed.

According to an embodiment, when the first object passes through another manufacturing process before the first manufacturing process, the process management apparatus 1000 may determine the intensive inspection region using not only the first process data related to the first manufacturing process but also previous process data related to a previous manufacturing process. For example, when the first manufacturing process is an n-th manufacturing process in an entire manufacturing process, the process management apparatus 1000 may determine the intensive inspection region using not only n-th process data (i.e., the first process data) related to the n-th manufacturing process but also n−1th process data related to an n−1th manufacturing process. At this time, an operation of the process management apparatus 1000 to determine the intensive inspection region may be performed through the AI model 300. An operation of the process management apparatus 1000 to determine the intensive inspection region by further using process data related to a manufacturing process before the first manufacturing process will be described later in detail with reference to FIG. 8.

According to an embodiment, the process management apparatus 1000 may determine the intensive inspection region in consideration of a process environment. For example, the process management apparatus 1000 may further use the first process data as well as information about a surrounding environment in which the first process equipment performing the first process operation operates to determine the first region of the first object as the intensive inspection region. Here, the information about the surrounding environment in which the first process equipment operates may include at least one of surrounding temperature information, surrounding humidity information, noise information, dust information, or vibration information, but is not limited thereto. An operation of the process management apparatus 1000 to determine the intensive inspection region in consideration of the process environment will be described later in detail with reference to FIG. 13.

According to an embodiment, the process management apparatus 1000 may further use the first process data as well as information about a material of the first object to determine the first region as the intensive inspection region. For example, in the case of glass, the defect occurrence probability in the center region may be high, and in the case of plastic, the defect occurrence probability on an outer circumferential surface may be high. In this case, when the material of the first object is glass, the process management apparatus 1000 may determine a certain region from the center of the first object as the intensive inspection region, and when the material of the first object is plastic, determine a part of the outer circumferential surface of the first object as the intensive inspection region.

According to an embodiment, in addition to the first process data, the process management apparatus 1000 may further use information about the surrounding environment in which the first process equipment performing the first process operation operates and the information about the material of the first object to determine the first region as the intensive inspection region.

In operation S430, according to an embodiment, the process management apparatus 1000 may control a first vision inspector to inspect whether a defect is present in the first region of the first object.

For example, the process management apparatus 1000 may transmit coordinate information of the first region to the first vision inspector. At this time, the process management apparatus 1000 may directly transmit the coordinate information of the first region to the first vision inspector, and transmit the coordinate information of the first region to the first vision inspector through an edge computer connected to the first vision inspector. According to an embodiment, the process management apparatus 1000 may transmit the coordinate information of the first region to the first vision inspector using short-range wireless communication.

According to an embodiment, the process management apparatus 1000 may transmit a control signal to perform intensive vision inspection on the first region together with the coordinate information of the first region to the first vision inspector. In this case, the first vision inspector may perform vision inspection on the first region of the first object according to the control signal.

According to an embodiment, the process management apparatus 1000 may perform basic inspection on an entire region of the first object, and transmit a control signal to perform intensive inspection on the first region of the first object to the first vision inspector. The basic inspection may mean a vision inspection performed at a lower intensity than the intensive inspection. For example, the basic inspection may be an inspection of analyzing a 2D image of an average resolution, and a precision inspection may be an inspection of analyzing a 2D image of a high resolution. Alternatively, the basic inspection may be an inspection of analyzing a 2D image, and the intensive inspection may be an inspection of analyzing a 3D image, but the disclosure is not limited thereto. That is, the process management apparatus 1000 may control the first vision inspector to perform first vision inspection on the entire region of the first object at a first inspection level, and may control the first vision inspector to perform second vision inspection on the entire region of the first object at a second inspection level. At this time, the second inspection level may be higher than the first inspection level.

Meanwhile, according to an embodiment, the process management apparatus 1000 may perform vision inspection on only the first region of the first object, and transmit a control signal not to perform vision inspection on a remaining region of the first object to the first vision inspector.

According to an embodiment, the process management apparatus 1000 may determine an inspection level with respect to the first region (the intensive inspection region) of the first object based on the AI model 300 and the first process data. For example, when the defect occurrence probability in the first region of the first object is high as a result of analyzing the first process data, the process management apparatus 1000 may upwardly adjust the inspection level with respect to the first region of the first object from the first level to the second level. When the defect occurrence probability in the first region of the first object is low as a result of analyzing the first process data, the process management apparatus 1000 may determine the inspection level with respect to the first region of the first object as the first level.

According to an embodiment, the inspection level may include at least one of a level for analyzing a 2D low-resolution image with respect to the intensive inspection region, a level for analyzing a 2D high-resolution image with respect to the intensive inspection region, a level for analyzing a 3D low-resolution with respect to the intensive inspection region, or a level for analyzing a 3D high-resolution image with respect to the intensive inspection region, but is not limited thereto. The inspection level will be described later with reference to FIG. 6.

According to an embodiment, the process management apparatus 1000 may control the first vision inspector to obtain at least one of a 2D image with respect to the first region of the first object and a 3D image with respect to the first region of the first object, according to the determined inspection level. For example, when the determined inspection level is the first level, the process management apparatus 1000 may control the first vision inspector to obtain the 2D image with respect to the first region, and when the determined inspection level is the second level, the process management apparatus 1000 may control the first vision inspector to obtain the 3D image with respect to the first region. On the other hand, when the determined inspection level is a third level, the process management apparatus 1000 may control the first vision inspector to obtain and analyze both the 2D image with respect to the first region and the 3D image with respect to the first region.

According to an embodiment, the process management apparatus 1000 may control the first vision inspector to obtain a low-resolution image with respect to the first region of the first object or a high-resolution image with respect to the first region of the first object. For example, when the defect occurrence probability of the first region is low, the process management apparatus 1000 may determine the inspection level as the first level and control the first vision inspector to obtain and analyze the low-resolution image with respect to the first region. On the other hand, when the defect occurrence probability of the first region is high, the process management apparatus 1000 may determine the inspection level as the second level and control the first vision inspector to obtain and analyze the high-resolution image with respect to the first region in detail.

According to an embodiment, when the process management apparatus 1000 detects an abnormality signal with respect to an operation of the first object during the first manufacturing process, the process management apparatus 1000 may upwardly adjust the inspection level with respect to the first object. For example, when the process management apparatus 1000 receives a notification signal that the abnormality signal with respect to the operation of the first object has been detected from the first process equipment during the first manufacturing process, the process management apparatus 1000 may upwardly adjust the inspection level with respect to the first region (the intensive inspection region). An operation of the process management apparatus 1000 to upwardly adjusting the inspection level when detecting the abnormal signal will be described in more detail with reference to FIG. 7.

Figure 5:
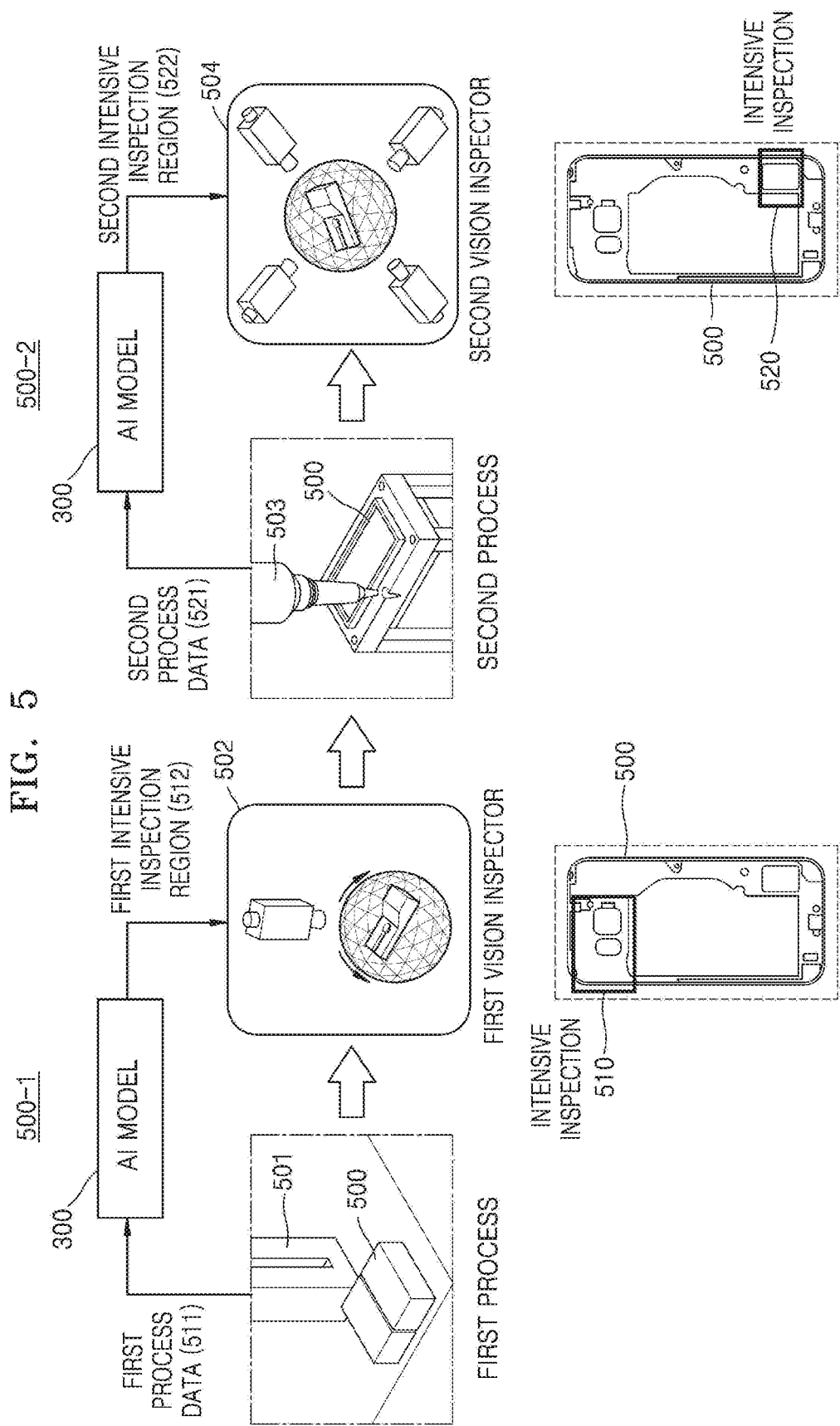
FIG. 5 is a diagram for explaining an operation of determining an intensive inspection region based on process data, according to an embodiment of the disclosure.

FIG. 5 is a diagram for explaining an operation of determining an intensive inspection region based on process data according to an embodiment of the disclosure. In FIG. 5, a first process is a cutting process, and a second process is a computer numerical control (CNC) process.

Referring to 500-1 of FIG. 5, when an object 500 that is a manufacturing target passes through the first process (e.g., the cutting process), a cutting equipment 501 may transmit first process data (for example, cutting process data) 511 to the process management apparatus 1000. At this time, the process management apparatus 1000 may determine a first intensive inspection region 512 by inputting the first process data (e.g., the cutting process data) 511 to the AI model 300. For example, when the first process data 511 is inputted, the AI model 300 may analyze information about a cutting direction, a cutting position, or whether an abnormal signal occurs, etc. included in the first process data 511 to determine a top left region 510 of the object 500 as a first intensive inspection region 512.

The process management apparatus 1000 may transmit coordinate information of the top left region 510 to a first vision inspector 502. In this case, the first vision inspector 502 may perform basic inspection on an entire region of the object 500 and intensive inspection on the top left region 510. For example, the first vision inspector 502 may obtain a 2D image of the entire region of the object 500 and analyze the 2D image to identify a part where a defect is present. The first vision inspector 502 may further obtain a 3D image of the top left region 510 of the object 500 and analyze the 3D image to determine whether the defect is present in the top left region 510. According to an embodiment, the first vision inspector 502 may rotate the object 500 while fixing a camera to obtain the 3D image.

When there is a minute crack in the top left region 510, the first vision inspector 502 may not find the minute crack during a basic inspection process. However, the first vision inspector 502 may identify the minute crack present in the top left region 510 by performing intensive inspection on the top left region 510.

Also, when dust is present on the top left region 510, the first vision inspector 502 may not distinguish dust from a scratch by only a basic inspection. Accordingly, the first vision inspector 502 may identify the scratch present in the top left region 510. However, the first vision inspector 502 may accurately identify that a part identified as the scratch is dust other than the scratch by performing intensive inspection on the top left region 510.

Referring to 500-2 of FIG. 5, when the object 500 that is the manufacturing target passes the second process (for example, the CNC process), a CNC equipment 503 may transmit second process data (for example, CNC process data) 512 to the process management apparatus 1000. At this time, the process management apparatus 1000 may determine a second intensive inspection region 522 by inputting the second process data (e.g., the CNC process data) 521 to the AI model 300. For example, when the second process data 521 is input, the AI model 300 may analyze information about a CNC operation position, an operation direction, or whether an abnormal signal occurs, etc. included in the second process data 521 to determine a bottom right region 520 of the object 500 as a second intensive inspection region 522.

The process management apparatus 1000 may transmit coordinate information of the bottom right region 520 to a second vision inspector 504. In this case, the second vision inspector 504 may perform basic inspection on an entire region of the object 500 and perform intensive inspection on the bottom right region 520. For example, the second vision inspector 504 may obtain a 2D image of the entire region of the object 500 and analyze the 2D image to identify a part where a defect is present. The second vision inspector 504 may further obtain a 3D image of the bottom right region 520 of the object 500 and analyze the 3D image to determine whether the defect is present in the bottom right region 520. According to an embodiment, the second vision inspector 504 may obtain the 3D image using a plurality of cameras.

When there is a minute crack in the bottom right region 520, the second vision inspector 504 may not find the minute crack during a basic inspection process. However, the second vision inspector 504 may detect the minute crack present in the bottom right region 520 by performing intensive inspection on the bottom right region 520.

Also, when dust is present on the bottom right region 520, the second vision inspector 504 may not distinguish dust from a scratch by only a basic inspection. Accordingly, the second vision inspector 504 may identify the scratch present in the bottom right region 520. However, the second vision inspector 504 may accurately identify that dust is present on the bottom right region 520 other than the scratch by performing intensive inspection on the bottom right region 520.

Therefore, according to an embodiment, the efficiency of the vision inspection may be increased by performing the intensive inspection on a region having a high defect occurrence probability based on process data just before performing the vision inspection.

FIG. 6 is a diagram for explaining an inspection level 620 according to an embodiment of the disclosure.

According to an embodiment, a vision inspection type 610 may be classified as a basic inspection 611 and an intensive inspection 612. The basic inspection 611 may mean a method of basically inspecting an entire region of an object that is a manufacturing target. The intensive inspection 612 may mean a method of intensively inspecting a specific region of the object.

The inspection level 620 may be variously defined. For example, in the case of the basic inspection 611, a level for analyzing a 2D image of the entire region may be defined as a basic level. At this time, the 2D image may be a low-resolution 2D image having a resolution lower than a threshold value or a 2D image having an average resolution, but is not limited thereto.

The basic level of the basic inspection 611 may be changed according to setting of a user, setting by the process management apparatus 1000, or setting of the management server 2000. For example, the level for analyzing the 2D image of the entire region may be defined as the basic level of the basic inspection 611.

In the case of the intensive inspection 612, a level for analyzing a 2D image (e.g., the 2D image of low resolution or the 2D image of average resolution) of the specific region may be defined as a first level, a level for analyzing a 2D image of high resolution of the specific region may be defined as a second level, a level for analyzing a 3D image (e.g., a 3D image of low resolution or a 3D image of average resolution) of the specific region may be defined as a third level, and a level for analyzing a 3D image of high resolution of the specific region may be defined as a fourth level, but the disclosure is not limited thereto.

Meanwhile, although in FIGS. 2 to 5, a vision inspector performs intensive inspection, in some cases, the vision inspector may perform only basic inspection.

Figure 7:
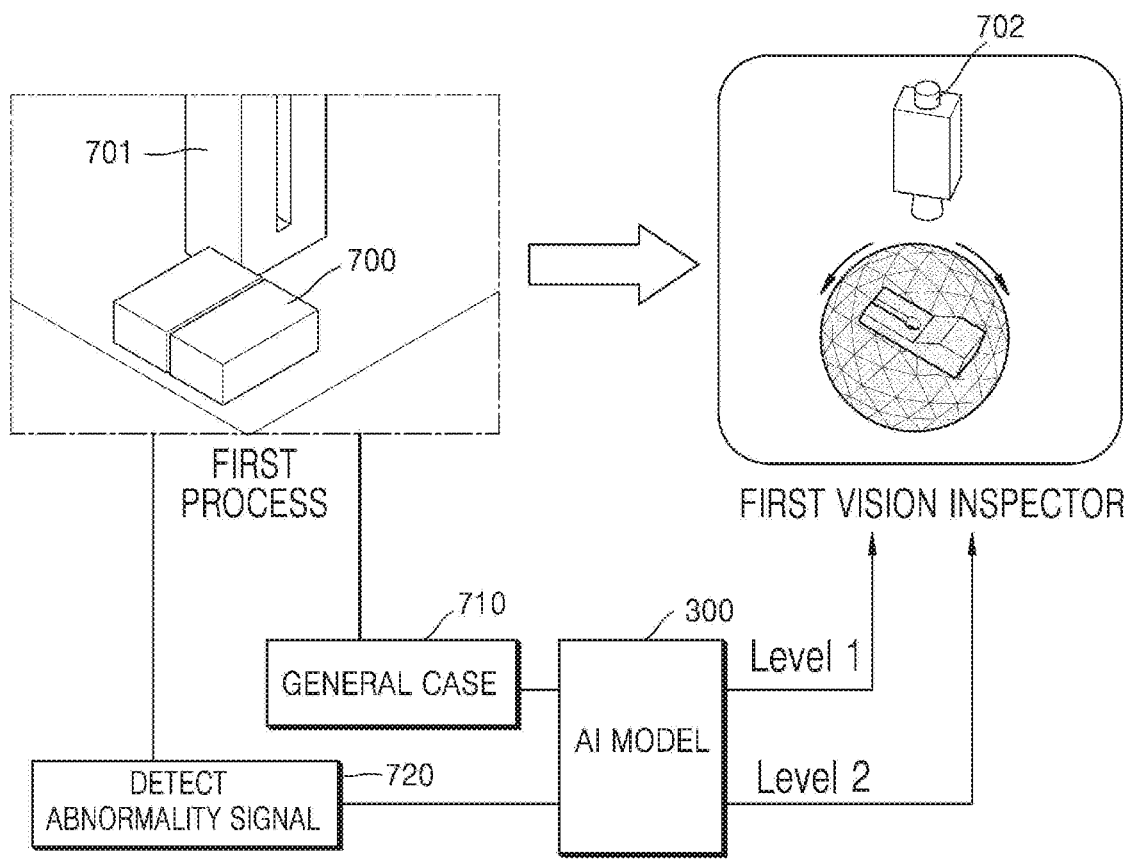
FIG. 7 is a diagram for explaining an operation of changing an inspection level when an abnormal signal is detected, according to an embodiment of the disclosure.

FIG. 7 is a diagram for explaining an operation of changing an inspection level when an abnormal signal is detected according to an embodiment of the disclosure.

Referring to FIG. 7, the process management apparatus 1000 may obtain first process data related to a first process through which an object 700 has passed from a first process equipment 701. The process management apparatus 1000 may apply the first process data to the AI model 300 to identify an intensive inspection region and an inspection level. When the first process data does not include a message that the object 700 has passed through the first process and an abnormal signal has been detected (i.e., in a general case 710), the AI model 300 may identify the inspection level as a first level (a level for analyzing a 2D image with respect to an intensive inspection region). In this case, the process management apparatus 1000 may control the first vision inspector 702 to perform intensive inspection at the first level. However, when the first process data includes a message that the object 700 has passed through the first process and the abnormal signal has been detected 720, the AI model 300 may identify the inspection level as a second level (a level for analyzing a 2D image of a specific region) instead of the first level (a level for analyzing a 2D image of high-resolution of the specific region). In this case, the process management apparatus 1000 may control the first vision inspector 702 to perform intensive inspection at the second level.

For example, in the case where the first process is a cutting process, a defect occurrence probability is less than 5% when the object 700 is cut to 5 cm, whereas the defect occurrence probability may increase by more than 10% when the object 700 is cut to 5.1 cm. Accordingly, the first process equipment 701 may detect that the abnormal signal has occurred when the object 700 is cut to 5.1 cm in the first process. In this case, the first process equipment 701 may transmit a message indicating that the abnormal signal has been detected to the process management apparatus 1000. According to an embodiment, the first process equipment 701 may include the message indicating that the abnormal signal has been detected in the first process data to transmit the message to the process management apparatus 1000 and may separate the message indicating that the abnormal signal has been detected from the first process data to transmit the message to the process management apparatus 1000.

Meanwhile, according to an embodiment, the first process equipment 701 may transmit notification data indicating that the abnormal signal has been detected to the first vision inspector 702 instead of the process management apparatus 1000. In this case, even when the first vision inspector 702 receives a control signal to perform intensive inspection at the first level from the process management apparatus 1000, the first vision inspector 702 may upwardly adjust the inspection level from the first level to the second level to perform intensive inspection at the second level. For example, even when the first vision inspector 702 receives a control signal for analyzing the 2D image from the process management apparatus 1000, in the case where the first vision inspector 702 receives the message indicating that the abnormal signal has been detected from the first process equipment 701, the first vision inspector 702 may obtain and analyze a 3D image instead of the 2D image.

Figure 8:
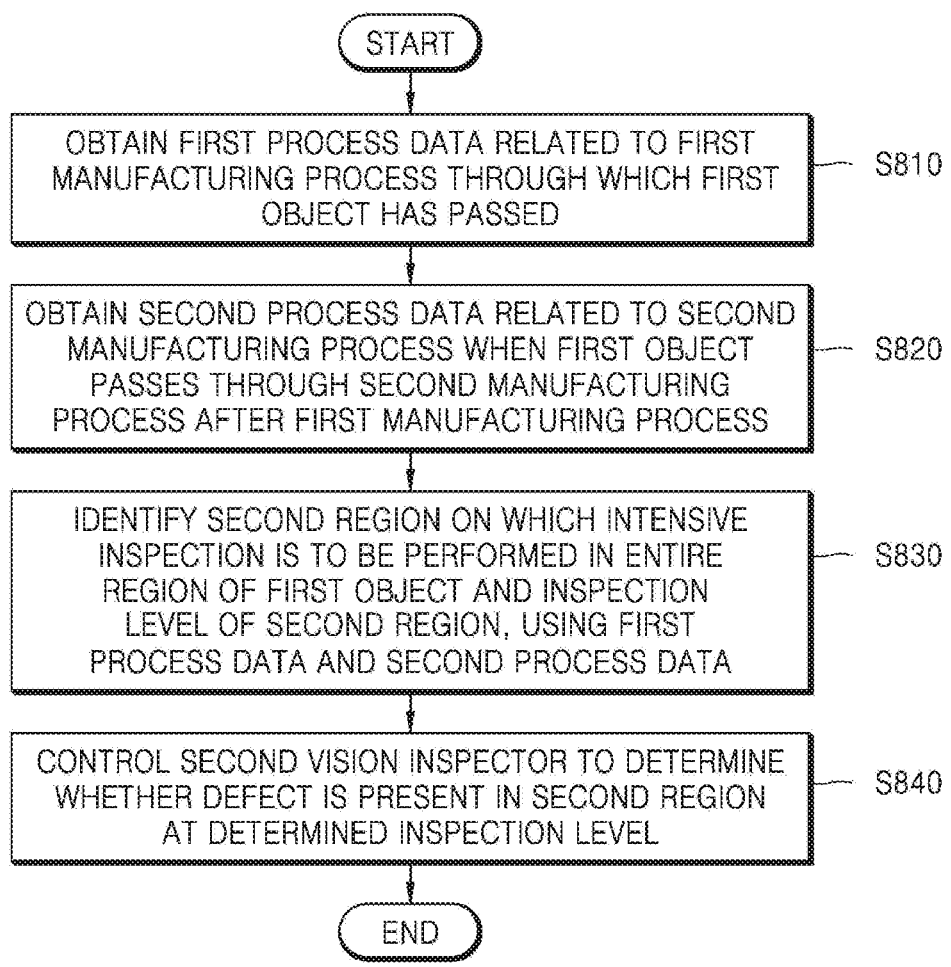
FIG. 8 is a flowchart for explaining a method of determining an intensive inspection region and an inspection level by applying process data of a previous manufacturing process, according to an embodiment of the disclosure.

FIG. 8 is a flowchart for explaining a method of determining an intensive inspection region and an inspection level by applying process data of a previous manufacturing process according to an embodiment of the disclosure.

In operation S810, the process management apparatus 1000 may obtain first process data related to a first manufacturing process through which a first object has passed. Operation S810 corresponds to operation S410 of FIG. 4, and thus a detailed description thereof will be omitted.

In operation S820, the process management apparatus 1000 may obtain second process data related to a second manufacturing process when the first object passes through the second manufacturing process after the first manufacturing process.

According to an embodiment, the second process data may include at least one of information about a second process equipment that performs the second manufacturing process, information about an operation part or content in the second manufacturing process, information about an order of the second manufacturing process in an entire manufacturing process, information about a defect rate occurring in the second manufacturing process, or context information generated in the second manufacturing process, but is not limited thereto. The context information generated in the second manufacturing process may include information about vibration, heat, dust, water vapor, and the like, but is not limited thereto.

According to an embodiment, the process management apparatus 1000 may receive the second process data from the second process equipment that performs the second process. For example, the second process equipment may transmit the second process data obtained while the first object passes through the second process to the process management apparatus 1000 over a wired/wireless network. According to an embodiment, the process management apparatus 1000 may receive the second process data directly from the second process equipment, and may receive the second process data from an edge computer connected to the second process equipment. The second process equipment may transmit the second process data related to an object to the process management apparatus 1000 every time objects pass through.

In operation S830, the process management apparatus 1000 may identify a second region on which intensive inspection is to be performed in an entire region of the first object and an inspection level of the second region, using the first process data and the second process data.

According to an embodiment, the process management apparatus 1000 may apply the first process data and the second process data to the AI model 300 to identify the second region as the intensive inspection region. The intensive inspection region may be a region having a high defect occurrence probability. For example, the AI model 300 may identify the intensive inspection region based on operation content with respect to the first object in the first manufacturing process and operation content with respect to the first object in the second manufacturing process. For example, in a case where an operation part in the first manufacturing process is an A region and an operation part in the second manufacturing process is a B region, the AI model 300 may identify a region where the A region and the B region overlap each other as the intensive inspection region.

According to an embodiment, the process management apparatus 1000 may apply the first process data and the second process data to the AI model 300 to identify the intensive inspection region and the inspection level. For example, the AI model 300 may identify the intensive inspection region and the inspection level based on the context information (e.g., vibration, heat, humidity, etc.) generated in the first manufacturing process and the operation content in the second manufacturing process. A case where the defect occurrence probability increases when vibration generated in the first manufacturing process is greater than a threshold value and an operation part in the second manufacturing process is a second region of the first object will be described as an example. The AI model 300 may identify the second region as the intensive inspection region because the operation part in the second object is the second region of the first object. When vibration generated in the first manufacturing process is smaller than the threshold value, the AI model 300 may identify the inspection level of the second region as a first level. On the other hand, when vibration generated in the first manufacturing process is greater than the threshold value, because the defect occurrence probability increases, the AI model 300 may identify the inspection level of the second region as a third level.

In operation S840, the process management apparatus 1000 may control a second vision inspector to determine whether a defect is present in the second region at the determined inspection level. The second vision inspector may be located after the second manufacturing process.

For example, the process management apparatus 1000 may transmit coordinate information of the second region and inspection level information of the second region to the second vision inspector. At this time, the process management apparatus 1000 may directly transmit the coordinate information of the second region and the inspection level information of the second region to the second vision inspector or may transmit the coordinate information of the second region and the inspection level information of the second region to the second vision inspector through an edge computer connected to the second vision inspector.

According to an embodiment, the process management apparatus 1000 may transmit a control signal including the coordinate information of the second region and the inspection level information of the second region to the second vision inspector using short-range wireless communication. In this case, the second vision inspector may perform vision inspection at the inspection level determined with respect to the second region according to the control signal. Meanwhile, the second vision inspector may further perform basic inspection on the entire region of the first object, but is not limited thereto. An operation of the AI model 300 to determine the intensive inspection region and the inspection level by applying process data of a previous manufacturing process will be described in more detail with reference to FIG. 9.

Figure 9:
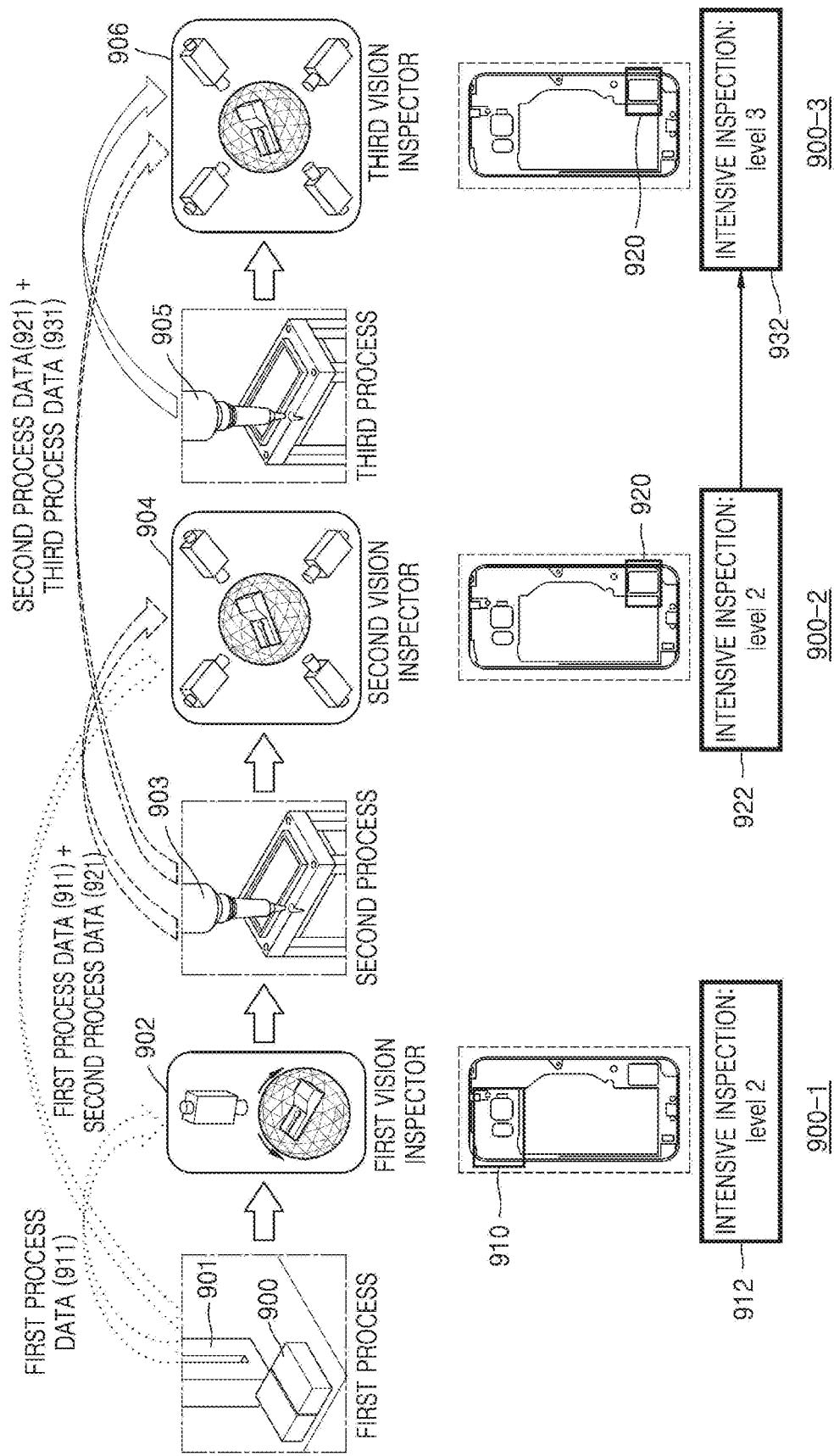
FIG. 9 is a diagram for explaining an operation of determining an intensive inspection region and an inspection level by applying process data of a current manufacturing process and process data of a previous manufacturing process, according to an embodiment of the disclosure.

FIG. 9 is a diagram for explaining an operation of determining an intensive inspection region and an inspection level by applying process data of a current manufacturing process and process data of a previous manufacturing process according to an embodiment of the disclosure. In FIG. 9, a first process is a cutting process, a second process is a first CNC process, and a third process is a second CNC process.

Referring to 900-1 of FIG. 9, when an object 900 that is a manufacturing target passes through the first process (e.g., the cutting process), a cutting equipment 901 may transmit first process data (e.g., cutting process data) 911 to the process management apparatus 1000. At this time, the process management apparatus 1000 may determine a first intensive inspection region 910 by inputting the first process data (e.g., the cutting process data) 911 to the AI model 300. For example, when the first process data 911 is input, the AI model 300 may analyze information about a cutting direction, a cutting position, or whether an abnormal signal occurs included in the first process data 911 to determine a top left region of the object 900 as the first intensive inspection region 910. On the other hand, based on the first process data 911, the AI model 300 may determine an inspection level 912 of the first intensive inspection region as a second level (for example, a level for analyzing a 3D image).

The process management apparatus 1000 may transmit coordinate information of the top left region 910 and information (e.g., the second level) about the inspection level 912 to a first vision inspector 902. In this case, the first vision inspector 902 may perform basic inspection on an entire region of the object 900 and intensive inspection on the top left region 910. For example, the first vision inspector 902 may obtain a 2D image of the entire region of the object 900 and analyze the 2D image to identify a part where a defect is present. The first vision inspector 902 may further obtain a 3D image of the top left region 910 of the object 900 and analyze the 3D image to determine whether the defect is present in the top left region 910.

Referring to 900-2 of FIG. 9, when the object 900 that is the manufacturing target passes through the second process (e.g., the first CNC process) after the first process, a first CNC equipment 903 may transmit second process data (e.g., first CNC process data) 921 to the process management apparatus 1000. At this time, the process management apparatus 1000 may determine a second intensive inspection region by inputting the first process data 911 related to the first process before the second process as well as the second process data (e.g., the first CNC process data) 921 to the AI model 300. For example, when the first process data 911 and the second process data 921 are input, the AI model 300 may analyze the information about the cutting direction, the cutting position, or whether the abnormal signal occurs included in the first process data 911 and information about a first CNC operation position, an operation direction, and whether the abnormal signal occurs included in the second process data 921 to determine bottom right region 920 of the object 900 as the second intensive inspection region. On the other hand, based on the first process data 911 and the second process data 921, the AI model 300 may determine an inspection level 922 with respect to the second intensive inspection region as the second level (e.g., the level for analyzing the 3D image).

The process management apparatus 1000 may transmit coordinate information of the bottom right region 920 and information about the inspection level 922 to a second vision inspector 904. In this case, the second vision inspector 904 may perform basic inspection on the entire region of the object 900 and intensive inspection on the bottom right region 920. For example, the second vision inspector 904 may obtain a 2D image of the entire region of the object 900 and analyze the 2D image to identify a part where the defect is present. The second vision inspector 904 may further obtain a 3D image of the bottom right region 920 of the object 900 and analyze the 3D image to determine whether the defect is present in the bottom right region 920.

Referring to 900-3 of FIG. 9, when the object 900 that is the manufacturing target passes through the third process (e.g., the second CNC process) after the first process and the second process, a second CNC equipment 905 may transmit third process data (e.g., second CNC process data) 931 to the process management apparatus 1000. At this time, the process management apparatus 1000 may determine a third intensive inspection region by inputting the second process data 921 related to the second process before the third process as well as the third process data (e.g., second CNC process data) 931 to the AI model 300. For example, when the second process data 921 and the third process data 931 are input, the AI model 300 may analyze the first CNC operation position, the operation direction, and whether the abnormal signal occurs included in the second process data 921 and information about a second CNC operation position, an operation direction, and whether the abnormal signal occurs included in the third process data 931 to determine the bottom right region 920 of the object 900 as the third intensive inspection region. For example, because the first CNC operation position is also the bottom right region 920 and the second CNC operation position is also the bottom right region 920, the AI model 300 may determine the bottom right region 920 of the two objects 900 as the third intensive inspection region.

On the other hand, based on the second process data 921 and the third process data 931, the AI model 300 may determine an inspection level 922 with respect to the second intensive inspection region as a third level (e.g., a level for analyzing the 3D image of high resolution).

For example, it is assumed that as a CNC operation on the same position is repeated, a defect occurrence probability of a position increases. That is, when a first CNC operation is performed on the bottom right region 920 after the cutting operation on the top left region 910, a first defect occurrence probability in the bottom right region 920 may be 0.5%. On the other hand, when a second CNC operation is performed again on the bottom right region 920 after the first CNC operation is performed on the bottom right region 920, a second defect occurrence probability in the bottom right region 920 may be 7%. Because the first defect occurrence probability is higher than the second defect occurrence probability, when the AI model 300 determines that the inspection level 922 with respect to the second intensive inspection region is the second level (e.g., the level for analyzing the 3D image), the AI model 300 may determine an inspection level 932 with respect to a third intensive inspection region as the third level (e.g., the level for analyzing the 3D image of high resolution).

The process management apparatus 1000 may transmit the coordinate information of the bottom right region 920 and information about the inspection level 932 to a third vision inspector 906. In this case, the third vision inspector 906 may perform basic inspection on the entire region of the object 900 and intensive inspection on the bottom right region 920. For example, the third vision inspector 906 may obtain a 2D image of the entire region of the object 900 and analyze the 2D image to identify a part where the defect is present. The third vision inspector 906 may further obtain a 3D image of high-resolution of the bottom right region 920 of the object 900 and analyze the 3D image of high-resolution to determine the defect present in the bottom right region 920.

Meanwhile, although not shown in FIG. 9, the process management apparatus 1000 may determine the third intensive inspection region and an inspection level of the third intensive inspection region by inputting not only the third process data (e.g., the second CNC process data) 931 and the second process data 921 but also the first process data 911 to the AI model 300.

Figure 10:
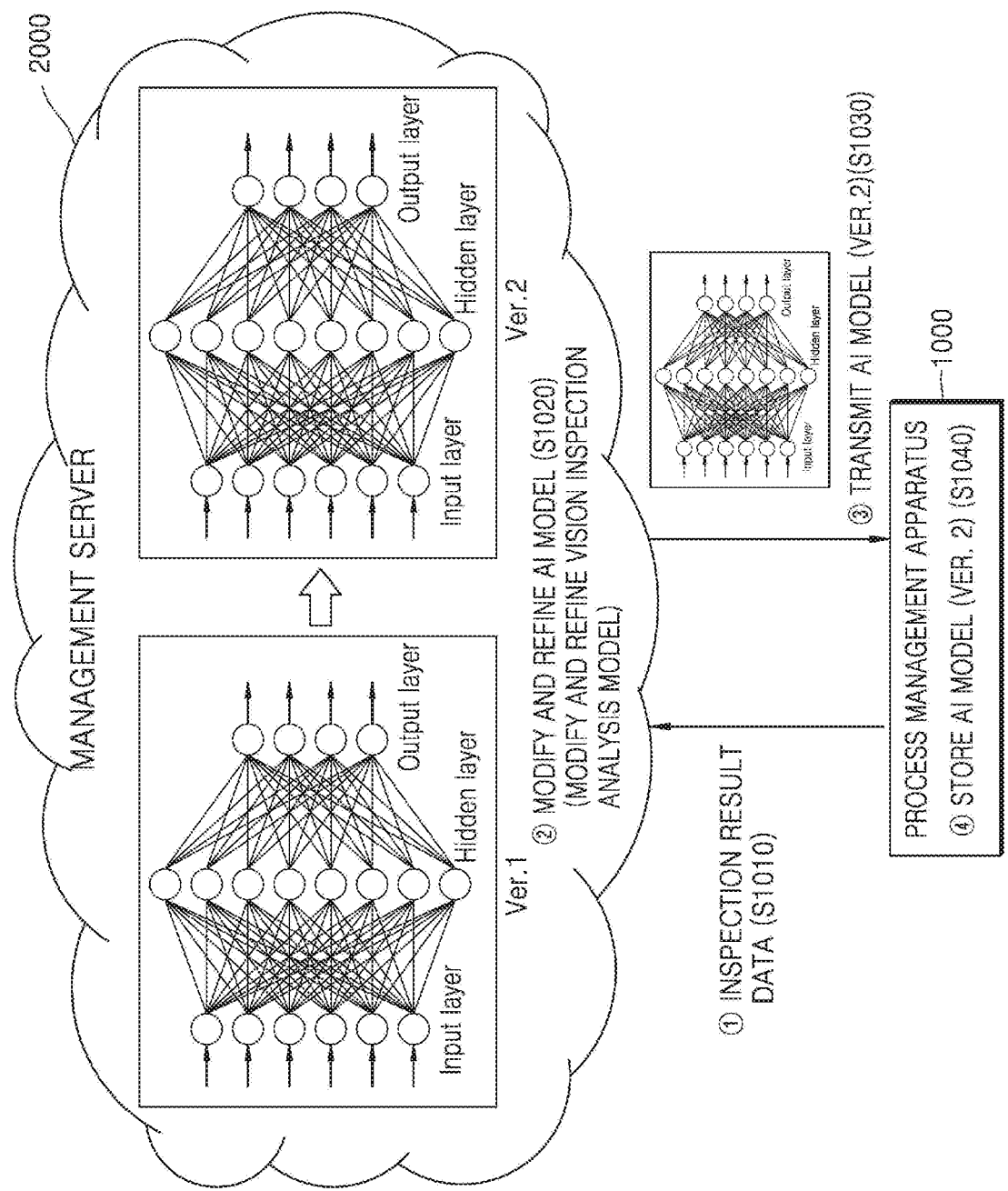
FIG. 10 is a diagram for explaining a system for modifying and refining an artificial intelligence (AI) model based on inspection result data, according to an embodiment of the disclosure.

FIG. 10 is a diagram for explaining a system for modifying and refining the AI model 300 based on inspection result data according to an embodiment of the disclosure.

In operation S1010, the process management apparatus 1000 may obtain the inspection result data from at least one vision inspector and transmit the obtained inspection result data to the management server 2000. For example, the process management apparatus 1000 may obtain at least one of first vision inspection result data (hereinafter, basic inspection result data) with respect to an entire region of a first object and second vision inspection result data (hereinafter, intensive inspection result data) with respect to an intensive inspection region of the first object.

According to an embodiment, the process management apparatus 1000 may transmit the inspection result data (for example, the basic inspection result data or the intensive inspection result data) together with process data obtained from at least one process equipment to the management server 2000.

Meanwhile, although not shown in FIG. 10, the management server 2000 may directly receive the inspection result data from the at least one vision inspector, not via the process management apparatus 1000.

In operation S1020, the management server 2000 may modify and refine the AI model 300 using the process data and the inspection result data (e.g., the basic inspection result data or the intensive inspection result data). That is, the management server 2000 may input the process data and the inspection result data (e.g., the basic inspection result data or the intensive inspection result data) into the AI model 300 as learning data (training data). In this case, the AI model 300 may be modified and refined by learning the process data and the inspection result data (e.g., the basic inspection result data or the intensive inspection result data). For example, when a defect is found in an 'X region' as a result of analyzing the inspection result data, the AI model 300 may compare the process data (e.g., a thermoforming temperature rises by 5% compared to a reference value) and the inspection result data (e.g. the defect is found in the 'X region') to learn a defect occurrence cause (e.g., a probability that the defect occurs in the X region when the thermoforming temperature increases). The AI model 300 may be modified and refined itself by applying the defect occurrence cause. A version of the AI model 300 before modified and refined may be defined as a first version and a version of the AI model 300 after modified and refined may be defined as a second version.

In operation S1030, according to an embodiment, when the AI model 300 is modified and refined, the management server 2000 may transmit the modified and refined AI model 300 (e.g., an AI model of the second version) to the process management apparatus 1000. In operation S1040, the process management apparatus 1000 may store the modified and refined AI model 300 (e.g., the AI model of the second version) received from the management server 2000 in a memory. Then, the process management apparatus 1000 may determine an intensive inspection region or an inspection level using the modified and refined AI model 300.

For example, before the AI model 300 is modified and refined, the process management apparatus 1000 may apply the process data to the AI model 300 of the first version to determine a first intensive inspection region and a first inspection level of the first intensive inspection region. After the AI model 300 is modified and refined, the process management apparatus 1000 may apply the process data to the AI model 300 of the second version to determine a second intensive inspection region and a second inspection level of the second intensive inspection region.

According to an embodiment, the AI model 300 may be adaptively modified and refined by reflecting the inspection result data received from a vision inspector, and thus the vision inspection efficiency may continuously increase.

Although not shown in FIG. 10, the management server 2000 may analyze the inspection result data and output a notification signal to an operator's computer when a defect is present in an object. At this time, the notification signal may include at least one of an audio signal, a visual signal, or a vibration signal, but is not limited thereto.

Figure 11:
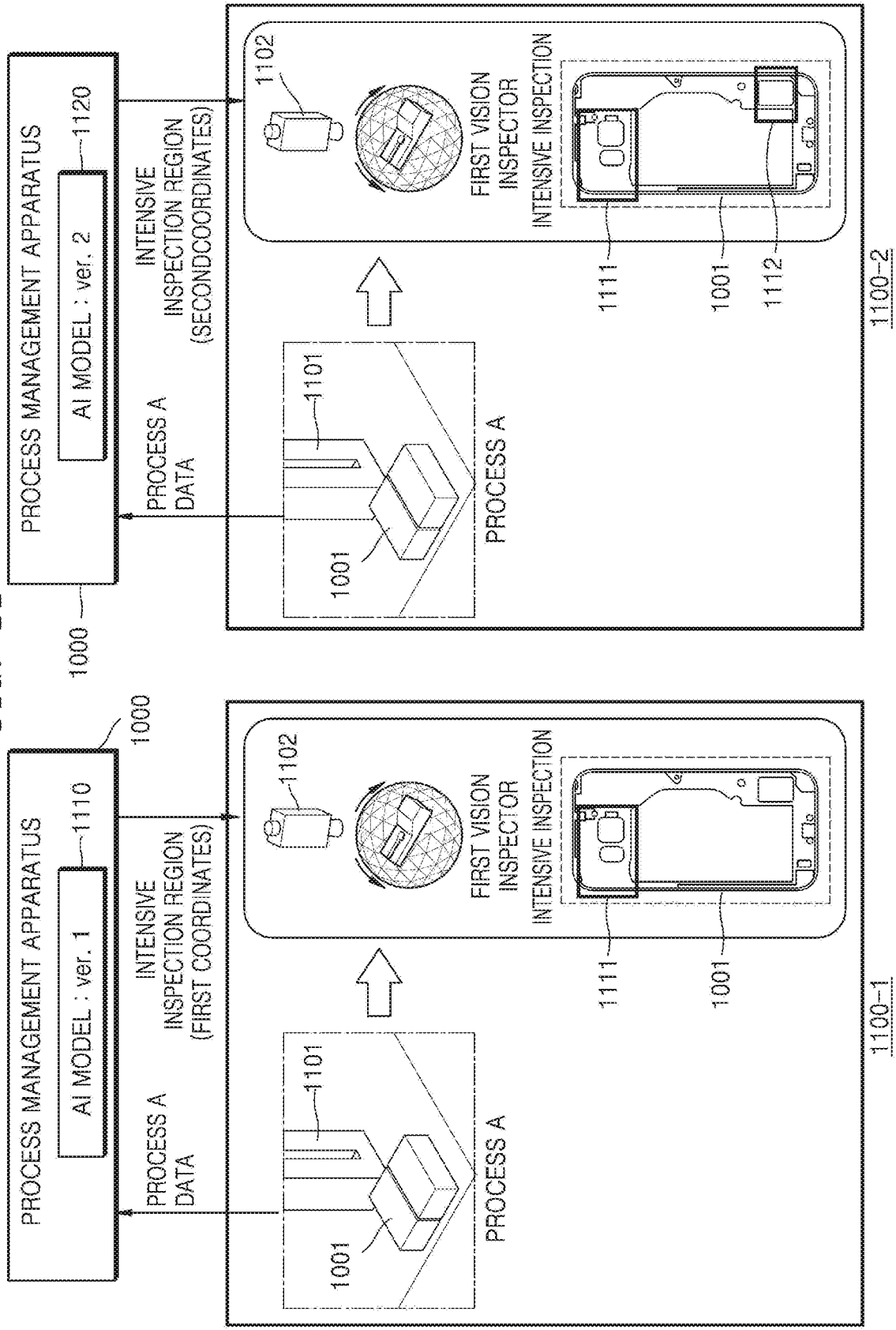
FIG. 11 is a diagram for explaining an operation of determining an intensive inspection region using a modified and refined AI model, according to an embodiment of the disclosure.

FIG. 11 is a diagram for explaining an operation of determining an intensive inspection region using a modified and refined AI model according to an embodiment of the disclosure. In FIG. 11, the AI model 300 before modified and refined may be defined as an AI model 1110 of a first version and the AI model 300 after modified and refined may be defined as an AI model 1120 of a second version.

Referring to 1100-1 of FIG. 11, the process management apparatus 1000 may determine an intensive inspection region using the AI model 1110 of the first version trained based on theoretical learning data. For example, the process management apparatus 1000 may obtain process A data related to the process A from a first equipment 1101 that performs the process A. The process management apparatus 1000 may apply the process A data to the AI model 1110 of the first version to determine a top left region 1111 of an object 1001 as the intensive inspection region. According to the theoretical learning data, after the process A is performed, a defect occurrence probability in the top left region 1111 of the object 1001 may be high.

The process management apparatus 1000 may transmit first coordinate information indicating the top left region 1111 to a first vision inspector 1102. In this case, the first vision inspector 1102 may perform intensive inspection on the top left region 1111 of the object 1001 and perform basic inspection on an entire region of the object 1001. When a vision inspection is completed, the first vision inspector 1102 may transmit vision inspection result data (basic inspection result data and intensive inspection result data) to the process management apparatus 1000. The process management apparatus 1000 may transmit the vision inspection result data to the management server 2000. The management server 2000 may input the vision inspection result data to the AI model 300 as learning data.

The AI model 300 may analyze the vision inspection result data and recognize that the defect occurrence probability is high not only in the top left region 1111 but also in a bottom right region 1112 after the process A is performed. In this case, the AI model 300 may be modified to determine both the top left region 1111 and the bottom right region 1112 as the intensive inspection region by reflecting the vision inspection result data when the process A data is input. Then, the management server 2000 may transmit the modified AI model 1120 of the second version to the process management apparatus 1000.

Referring to 1100-2 in FIG. 11, the process management apparatus 1000 may determine the intensive inspection region using the AI model 1120 of the second version. For example, the process management apparatus 1000 may obtain the process A data related to the process A from the first equipment 1101 that performs the process A. The process management apparatus 1000 may apply the process A data to the AI model 1120 of the second version to determine the top left region 1111 and the bottom right region 1112 of the object 1001 as the intensive inspection region.

The process management apparatus 1000 may transmit second coordinate information indicating the top left region 1111 and the bottom right region 1112 to the first vision inspector 1102. In this case, the first vision inspector 1102 may perform intensive inspection on the top left region 1111 and the bottom right region 1112 of the object 1001 and perform basic inspection on the entire region of the object 1001. When the vision inspection is completed, the first vision inspector 1102 may transmit the vision inspection result data (the basic inspection result data and the intensive inspection result data) to the process management apparatus 1000. The process management apparatus 1000 may transmit the vision inspection result data to the management server 2000. The management server 2000 may input the vision inspection result data to the AI model 300 as learning data.

According to an embodiment, the AI model 300 for determining the intensive inspection region may be modified and refined by learning the vision inspection result data, and thus the intensive inspection region based on the process data may be adaptively changed.

Figure 12:
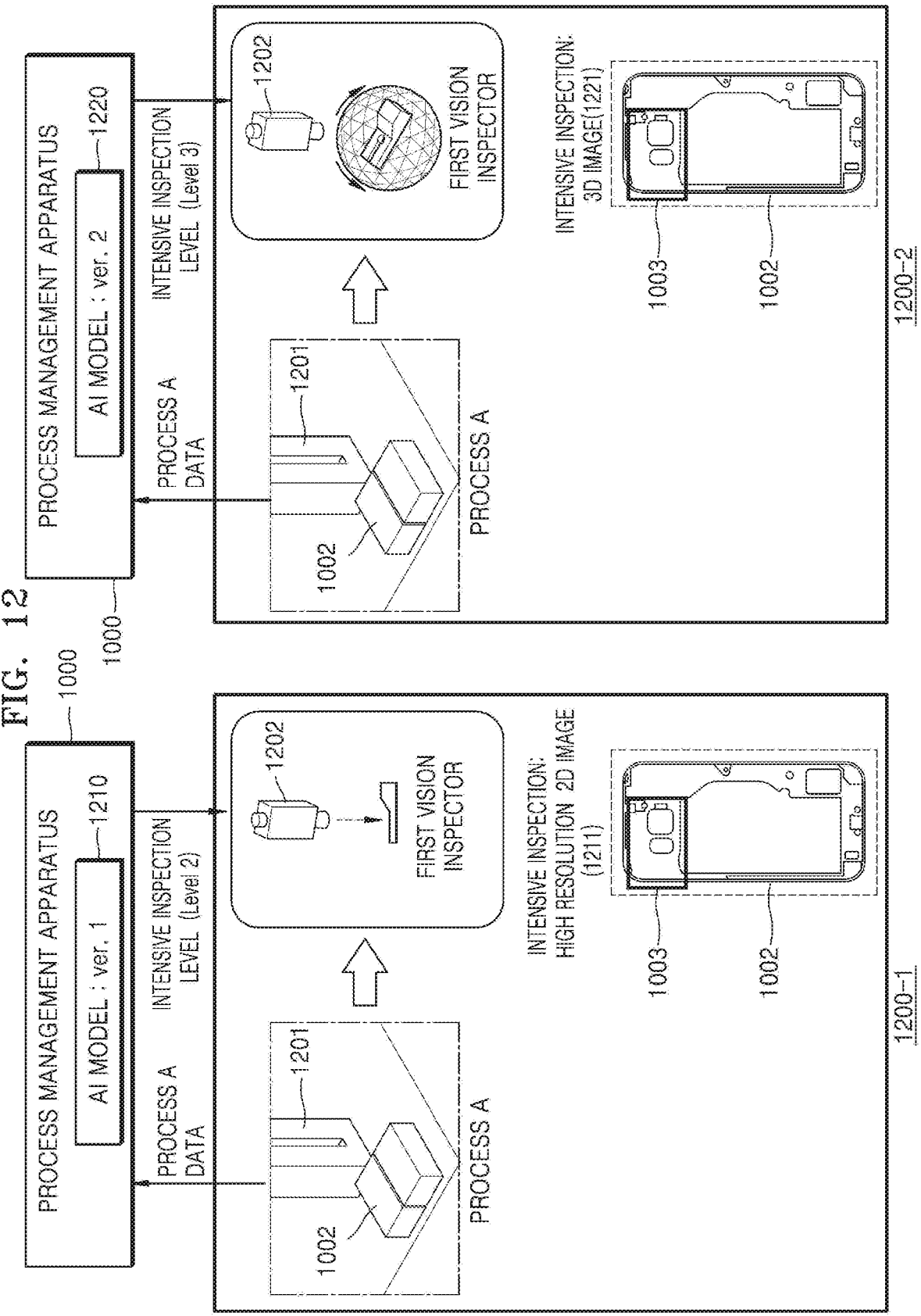
FIG. 12 is a diagram for explaining an operation of determining an inspection level using a modified AI model, according to an embodiment of the disclosure.

FIG. 12 is a diagram for explaining an operation of determining an inspection level using a modified AI model according to an embodiment of the disclosure. In FIG. 12, the AI model 300 before modified may be defined as an AI model 1210 of a first version, and the AI model 300 after modified may be defined as an AI model 1220 of a second version.

Referring to 1200-1 of FIG. 12, the process management apparatus 1000 may use the AI model 1210 of the first version trained based on theoretical learning data to determine the inspection level (hereinafter, an intensive inspection level) with respect to an intensive inspection region. For example, the process management apparatus 1000 may obtain process A data related to the process A from a first equipment 1201 that performs the process A. The process management apparatus 1000 may apply the process A data to the AI model 1210 of the first version to determine a top left region 1003 of an object 1002 as the intensive inspection region. For example, when an operation part in the process A is related to the top left region 1003, the AI model 1210 of the first version may determine the top left region 1003 of the object 1002 as the intensive inspection region.

Meanwhile, according to the theoretical learning data, a defect occurrence probability in the object 1002 after the process A is performed may be between a first threshold value (e.g., 0.5%) and a second threshold value (2%). The AI model 1210 of the first version may use the defect occurrence probability to determine the intensive inspection level as a second level (e.g., a level for analyzing a 2D image of high resolution).

The process management apparatus 1000 may transmit coordinate information indicating the top left region 1003 and intensive inspection level information indicating the second level to a first vision inspector 1202. In this case, the first vision inspector 1202 may perform intensive inspection on the top left region 1003 of the object 1002 at the second level and perform basic inspection on an entire region of the object 1002. For example, the first vision inspector 1202 may obtain a 2D image 1211 of high resolution with respect to the top left region 1003. The first vision inspector 1202 may analyze the 2D image 1211 of high resolution to identify a defect (e.g. a crack, a scratch, etc.) present in the top left region 1003. The first vision inspector 1202 may obtain a 2D image of general resolution with respect to the entire region of the object 1002 and analyze the 2D image of general resolution to identify the defect present in a region other than the top left region 1003. When the vision inspection is completed, the first vision inspector 1202 may transmit vision inspection result data (basic inspection result data and intensive inspection result data) to the process management apparatus 1000. The process management apparatus 1000 may transmit the vision inspection result data to the management server 2000. The management server 2000 may input the vision inspection result data to the AI model 300 as learning data.

When the AI model 300 analyzes the vision inspection result data, the defect occurrence probability in the object 1002 may be equal to or higher than the second threshold value (2%) after the process A is performed, differently from the theoretical learning data. In this case, the AI model 300 may be modified to identify the intensive inspection level of the top left region 1003 as a third level (a level for analyzing a 3D image) instead of the second level (e.g. the level for analyzing the 2D image of high resolution) when the process A data is input by reflecting the vision inspection result data. Then, the management server 2000 may transmit the modified AI model 1220 of the second version to the process management apparatus 1000.

Referring to 1200-2 of FIG. 12, the process management apparatus 1000 may determine the intensive inspection region and the intensive inspection level using the AI model 1220 of the second version. For example, the process management apparatus 1000 may obtain the process A data related to the process A from the first equipment 1201 that performs the process A. The process management apparatus 1000 may apply the process A data to the AI model 1220 of the second version to determine a left top region 1003 of the object 1002 as the intensive inspection region and the intensive inspection level as a 'third level'.

The process management apparatus 1000 may transmit coordinate information indicating the top left region 1003 and intensive inspection level information indicating the third level to the first vision inspector 1202. In this case, the first vision inspector 1202 may perform intensive inspection on the top left region 1003 of the object 1002 at the third level and perform basic inspection on the entire region of the object 1002. For example, the first vision inspector 1202 may obtain a 3D image 1221 of the top left region 1003. The first vision inspector 1202 may analyze the 3D image 1221 to identify a defect (e.g., a crack, a scratch, etc.) present in the top left region 1003. The first vision inspector 1202 may obtain a 2D image of general resolution with respect to the entire region of the object 1002 and analyze the 2D image of general resolution to identify a defect present in a region other than the top left region 1003. When the vision inspection is completed, the first vision inspector 1202 may transmit vision inspection result data (basic inspection result data and intensive inspection result data) to the process management apparatus 1000. The process management apparatus 1000 may transmit the vision inspection result data to the management server 2000. The management server 2000 may input the vision inspection result data to the AI model 300 as learning data.

According to an embodiment, the AI model 300 for determining the intensive inspection level may be modified and refined by learning the vision inspection result data, and thus the quality of intensive inspection based on process data may be adaptively improved.

Figure 13:
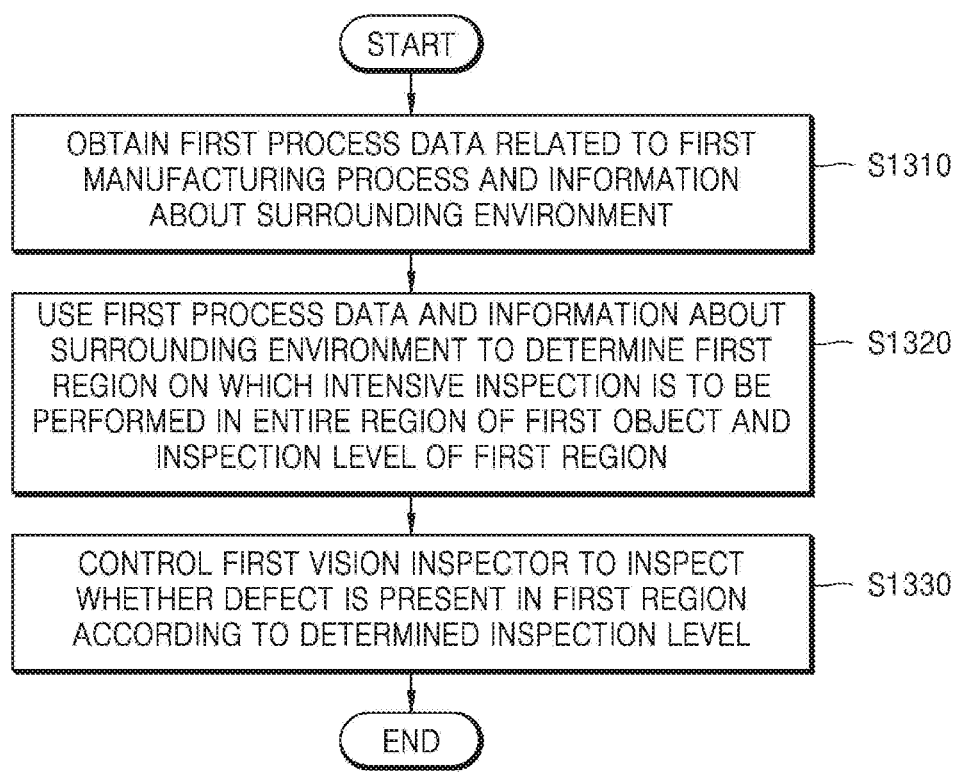
FIG. 13 is a flowchart illustrating a method of determining an intensive inspection region and an inspection level in consideration of surrounding environment information, according to an embodiment of the disclosure.

FIG. 13 is a flowchart illustrating a method of determining an intensive inspection region and an inspection level in consideration of surrounding environment information according to an embodiment of the disclosure.

In operation S1310, the process management apparatus 1000 may obtain first process data related to a first manufacturing process and information about a surrounding environment.

According to an embodiment, the first process data may include at least one of information about a first process equipment that performs the first manufacturing process, information about an operation part or content in the first process, information about an order of the first manufacturing process during an entire manufacturing process, information about a defect rate occurring in the first manufacturing process, or context information generated in the first manufacturing process, is not limited thereto. Also, the context information generated in the first manufacturing process may include information about vibration, heat, dust, water vapor, and the like, but is not limited thereto.

According to an embodiment, the process management apparatus 1000 may receive the first process data from the first process equipment that performs the first manufacturing process. For example, the first process equipment may transmit the first process data obtained while a first object passes through the first manufacturing process to the process management apparatus 1000 over a wired/wireless network. According to an embodiment, the process management apparatus 1000 may receive the first process data directly from the first process equipment, and may receive the first process data from an edge computer connected to the first process equipment. The first process equipment may transmit the first process data related to an object to the process management apparatus 1000 every time objects pass through.

Meanwhile, according to an embodiment, the process management apparatus 1000 may obtain, from at least one environment sensor, the information about the surrounding environment in which the first process equipment that performs the first manufacturing process operates. The information about the surrounding environment may include at least one of surrounding temperature information, surrounding humidity information, surrounding noise information, surrounding vibration information, or surrounding dust distribution information, but is not limited thereto. The at least one environment sensor may also include at least one of a temperature sensor, a humidity sensor, a vibration sensor, a noise sensor, or a dust sensor, but is not limited thereto.

According to an embodiment, the process management apparatus 1000 may receive sensing values measured by the at least one environment sensor directly or through an edge computer connected to the at least one environment sensor. According to an embodiment, the at least one environment sensor may transmit the sensing values to the process management apparatus 1000 at a predetermined interval and may transmit the sensing values to the process management apparatus 1000 when a specific event occurs. For example, the temperature sensor may transmit a temperature value to the process management apparatus 1000 at a predetermined period, or may transmit the temperature value to the process management apparatus 1000 when an event in which a surrounding temperature exceeds 30° C. occurs.

In operation S1320, the process management apparatus 1000 may use the first process data and the information about the surrounding environment to determine a first region on which intensive inspection is to be performed in an entire region of a first object and an inspection level (hereinafter, an intensive inspection level) of the first region.

According to an embodiment, when the process management apparatus 1000 inputs the first process data and the information about the surrounding environment to the AI model 300, the AI model 300 may determine an intensive inspection region and the intensive inspection level based on the first process data and the information about the surrounding environment. For example, when the first manufacturing process is a process of cutting a top right end of the first object and a surrounding humidity is 50%, the AI model 300 may determine a top right region as the first region on which intensive inspection is to be performed and determine the intensive inspection level as a second level. Also, when the first manufacturing process is the process of cutting the top right end of the first object and the surrounding humidity is 70%, the AI model 300 may determine the top right region as the first region on which intensive inspection is to be performed and determine the intensive inspection level as a third level. That is, when a defect occurrence probability increases in the case where the surrounding humidity is high, the AI model 300 may raise the intensive inspection level as the surrounding humidity is higher such that a vision inspector may find even a minute defect.

Also, when the first manufacturing process is the process of cutting the top right end of the first object and an earthquake occurs during the first manufacturing process and a vibration value measured by the vibration sensor is greater than a threshold value, the AI model 300 may determine the top right region as the first region on which intensive inspection is to be performed and determine the intensive inspection level as a highest level (e.g., a level for analyzing a 3D image of high resolution). When the earthquake occurs during a manufacturing process, because a defect occurrence probability in an object increases, the AI model 300 may determine the intensive inspection level to be high.

In operation S1330, the process management apparatus 1000 may control a first vision inspector to inspect whether a defect is present in the first region according to the determined inspection level. For example, the process management apparatus 1000 may transmit, to the first vision inspector, a control signal including information about the intensive inspection region (e.g., coordinate information) and information about the intensive inspection level. In this case, the first vision inspector may perform vision inspection on the intensive inspection region of the object according to the control signal.

An operation of the AI model 300 to identify the intensive inspection level by applying the surrounding environment information will be described in more detail with reference to FIG. 14.

Figure 14:
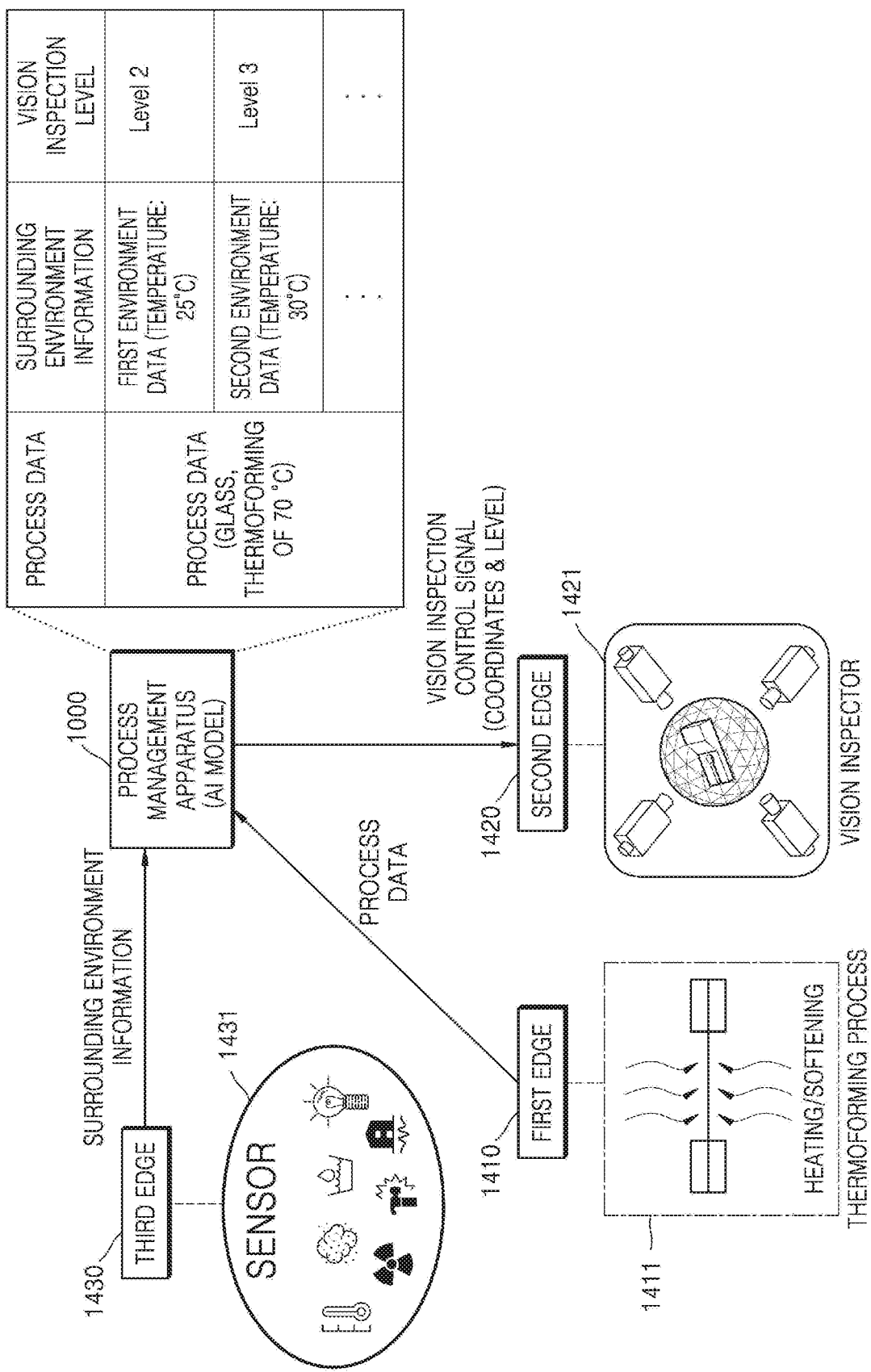
FIG. 14 is a diagram for explaining an operation of determining an intensive inspection level by applying surrounding environment information, according to an embodiment of the disclosure.

FIG. 14 is a diagram for explaining an operation of determining an intensive inspection level by applying surrounding environment information according to an embodiment of the disclosure. In FIG. 14, a case where a manufacturing process is a 70° C. thermoforming process with respect to glass will be described as an example.

According to an embodiment, the process management apparatus 1000 may obtain process data (e.g., thermoforming process data) related to a thermoforming process from a first edge computer 1410 connected to a thermoforming machine 1411 that performs a thermoforming process. For example, the thermoforming machine 1411 may transmit the process data to the first edge computer 1410. At this time, the first edge computer 1410 may receive the process data from the thermoforming machine 1411 and transmit the received process data to the process management apparatus 1000.

According to an embodiment, the first edge computer 1410 may filter the received process data and transmit the filtered process data to the process management apparatus 1000. For example, the first edge computer 1410 may select partial data necessary for determining an intensive inspection region and the intensive inspection level from the process data received from the thermoforming machine 1411 according to a predetermined reference and may transmit the selected partial data to the process management apparatus 1000.

According to an embodiment, the process management apparatus 1000 may obtain the surrounding environment information from a third edge computer 1430 connected to at least one environment sensor 1431. For example, when the third edge computer 1430 is connected to a temperature sensor, a humidity sensor, and a vibration sensor, the third edge computer 1430 may transmit a temperature measurement value received from the temperature sensor, a humidity measurement value received from the humidity sensor, and a vibration sensor value received from the vibration sensor to the process management apparatus 1000.

According to an embodiment, the third edge computer 1430 may filter the surrounding environment information received from the at least one environment sensor 1431 and transmit the filtered surrounding environment information to the process management apparatus 1000. For example, the third edge computer 1430 may select partial data necessary for determining an intensive inspection region and the intensive inspection level from the surrounding environment information received from the at least one environment sensor 1431 according to a predetermined reference and may transmit the selected partial data to the process management apparatus 1000.

The process management apparatus 1000 may input the process data (e.g., the thermoforming data) received from the first edge computer 1410 and the surrounding environment information received from the third edge computer 1430 to the AI model 300. The AI model 300 may determine the intensive inspection region and the intensive inspection level using the process data and the surrounding environment information. For example, when a crack occurrence probability at a center portion is high after thermoforming at 70° C., the AI model 300 may determine a center region of an object as the intensive inspection region. Also, when a surrounding temperature of the thermoforming machine 1411 is 25° C. by applying the surrounding environment information, because the crack occurrence probability is less than 0.5%, the AI model 300 may determine the intensive inspection level as a second level (e.g., a level for analyzing a 3D image of high resolution). On the other hand, when the surrounding temperature of the thermoforming machine 1411 is 30° C., because the crack occurrence probability is greater than 5%, the AI model 300 may determine the intensive inspection level as a third level (e.g., a level for analyzing a 3D image).

The process management apparatus 1000 may transmit, to a second edge computer 1420, a vision inspection control signal including coordinate information indicating the intensive inspection region and information about the intensive inspection level. The second edge computer 1420 may transmit the vision inspection control signal to the vision inspector 1421 connected to the second edge computer 1420. The vision inspector 1421 may perform vision inspection on the object according to the vision inspection control signal. For example, the vision inspector 1421 may perform intensive inspection on the center region of the object and perform basic inspection on an entire region of the object.

According to an embodiment, the vision inspector 1421 may transmit vision inspection result data to the second edge computer 1420 when the vision inspection is completed. The second edge computer 1420 may transmit the vision inspection result data to the process management apparatus 1000. According to an embodiment, the second edge computer 1420 may transmit the whole vision inspection result data received from the vision inspector 1421 to the process management apparatus 1000, and transmit only the partial vision inspection result data to the process management apparatus 1000). For example, the second edge computer 1420 may transmit only the vision inspection result data including an identifier indicating that a defect is present in the object to the process management apparatus 1000.

Figure 15:
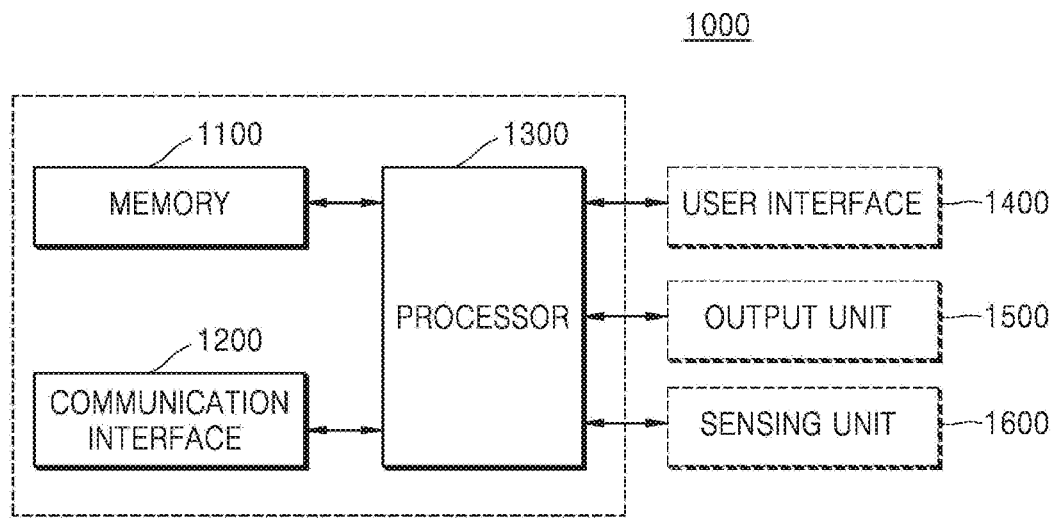
FIG. 15 is a block diagram illustrating a process management apparatus according to an embodiment of the disclosure.

FIG. 15 is a block diagram illustrating the process management apparatus 1000 according to an embodiment of the disclosure.

Referring to FIG. 15, the process management apparatus 1000 may include a memory 1100, a communication interface 1200, and a processor 1300. However, all illustrated components are not indispensable components. The process management apparatus 1000 may be implemented by more components than the components shown in FIG. 15, and the process management apparatus 1000 may be implemented by fewer components than the components shown in FIG. 15.

Hereinafter, the components will be described in order.

The memory 1100 may store programs for processing and control of the processor 1300 and may store input/output data (e.g., process data, vision inspection result data, information about a surrounding environment, etc.)

The memory 1100 may include at least one type of storage medium such as a flash memory type, a hard disk type, a multimedia card micro type, a card type memory (e.g., secure digital (SD) or XD memory), random access memory (RAM), static RAM (SRAM), read only memory (ROM), electrically erasable programmable ROM (EEPROM), programmable ROM (PROM), a magnetic memory, a magnetic disk, and an optical disk.

The programs stored in the memory 1100 may be classified into a plurality of modules according to their functions, and may include, for example, the AI model 300 for determining an intensive inspection region. The AI model 300 is described with reference to FIG. 3, and thus a detailed description thereof will be omitted here. Meanwhile, a process of generating the AI model 300 will be described in detail later with reference to FIGS. 16 to 19.

The communication interface 1200 may include one or more components that enable the process management apparatus 1000 to communicate with at least one process equipment, the management server 2000, at least one vision inspector, or an edge computer. For example, the communication interface 1200 may include a short-range wireless communication interface, a mobile communication interface, and the like, but is not limited thereto.

The short-range wireless communication interface may include a Bluetooth communication interface, a Bluetooth low energy (BLE) communication interface, a near field communication interface, a WLAN (WiFi) communication interface, a Zigbee communication interface, an infrared Data Association (IrDA) communication interface, a WFD (Wi-Fi Direct) communication interface, an UWB (ultra-wideband) communication interface, an Ant+ communication interface, and the like, but is not limited thereto.

The mobile communication interface may transmit and receive a wireless signal to and from at least one of a base station, an external terminal, or the management server 2000 on a mobile communication network. Here, the wireless signal may include a voice call signal, a video call signal, or various types of data according to transmission/reception of a message.

The communication interface 1200 may obtain first process data related to a first manufacturing process through which a first object has passed. According to an embodiment, the communication interface 1200 may receive the first process data from a first process equipment and may receive the first process data from an edge computer connected to the first process equipment.

The communication interface 1200 may obtain second process data related to a second manufacturing process when the first object passes through the second manufacturing process after the first manufacturing process. According to an embodiment, the communication interface 1200 may receive the second process data from a second process equipment and may receive the second process data from an edge computer connected to the second process equipment.

The communication interface 1200 may transmit a control signal including information (e.g., coordinate information) about the intensive inspection region and information about an intensive inspection level to a vision inspector. At this time, the communication interface 1200 may receive vision inspection result data from the vision inspector. For example, the communication interface 1200 may obtain first vision inspection result data with respect to an entire region of the first object and second vision inspection result data with respect to a first region of the first object from a first vision inspector. According to an embodiment, the communication interface 1200 may receive the vision inspection result data directly from the vision inspector, or may receive the vision inspection result data via an edge computer connected to the vision inspector.

The communication interface 1200 may obtain information about a surrounding environment in which the first process equipment that performs the first manufacturing process operates. For example, the communication interface 1200 may obtain the information about the surrounding environment from at least one environment sensor or from an edge computer connected to the at least one environment sensor.

The communication interface 1200 may obtain information about a material of the first object. According to an embodiment, the communication interface 1200 may receive the information about the material of the first object along with the first process data from the first process equipment. According to another embodiment, the communication interface 1200 may receive the information about the material of the first object from the management server 2000.

The communication interface 1200 may receive the AI model 300 from the management server 2000. According to an embodiment, when the AI model 300 is modified, the communication interface 1200 may receive the modified AI model 300 from the management server 2000. Meanwhile, the communication interface 1200 may transmit at least one of the process data, the vision inspection result data, or the information about the surrounding environment to the management server 2000, but is not limited thereto.

The processor 1300 may typically control an overall operation of the process management apparatus 1000. For example, the processor 1300 may generally control the communication interface 1200, a user interface 1400, an output unit 1500, a sensing unit 1600, and the like by executing the programs stored in the memory 1100.

According to an embodiment, the processor 1300 may include an AI processor for generating a learning network model, but is not limited thereto. According to an embodiment, the AI processor may be implemented as a chip separated from the processor 1300.

According to an embodiment, the processor 1300 may determine the first region in the entire region of the first object as the intensive inspection region using the AI model 300 and the first process data. The processor 1300 may determine the inspection level with respect to the first region based on the AI model 300 and the first process data. The inspection level may include at least one of a level for analyzing a 2D low-resolution image with respect to the first region, a level for analyzing a 2D high-resolution image with respect to the first region, a level for analyzing a 3D low-resolution image with respect to the first region, or a level for analyzing a 3D high-resolution image, but is not limited thereto.

The processor 1300 may control a first vision inspector to inspect whether a defect is present in the determined first region. For example, the processor 1300 may control the first vision inspector to perform first vision inspection (e.g., basic inspection) on the entire region of the first object at a first inspection level and perform second vision inspection (e.g., intensive inspection) on the first region of the first object at a second inspection level. At this time, the second inspection level may be higher than the first inspection level.

On the other hand, when the processor 1300 detects an abnormality signal with respect to an operation of the first object during the first manufacturing process, the processor 1300 may control the first vision inspector to perform second vision inspection (e.g., intensive inspection) on the first region at a third inspection level higher than the second inspection level.

According to an embodiment, when the processor 1300 obtains the second process data related to the second manufacturing process after the first manufacturing process, based on the first process data and the second process data, the processor 1300 may determine a second region in the entire region of the first object as the intensive inspection region. The processor 1300 may then control a second vision inspector to inspect whether a defect is present in the second region.

According to an embodiment, the processor 1300 may use the first process data, the first vision inspection result data (e.g., basic inspection result data) and the second vision inspection result data (e.g., intensive inspection result data) to modify the AI model 300. The processor 1300 may modify the AI model 300 by applying the first process data, the first vision inspection result data (e.g., basic inspection result data) and the second vision inspection result data (e.g., intensive inspection result data) to the AI model 300 stored in the process management apparatus 1000. According to another embodiment, the processor 1300 may control the communication interface 1200 to transmit the first process data, the first vision inspection result data (e.g., basic inspection result data) and the second vision inspection result data (e.g., intensive inspection result data) to the management server 200 such that the AI model 300 stored in the management server 2000 may be modified.

The processor 1300 may further use at least one of the information about the surrounding environment in which the first processing equipment that performs the first manufacturing process operates and the information about the material of the first object to determine the first region as the intensive inspection region.

The user interface 1400 means a means for a user to input data for controlling the process management apparatus 1000. For example, the user interface 1400 may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, and the like, but is not limited thereto.

The output unit 1500 may be used to output an audio signal, a video signal, or a vibration signal, and may include a display, a sound output unit, a vibration motor, and the like.

The display may display and output information processed in the process management apparatus 1000. For example, the display may display process equipment connected to the process management apparatus 1000, entire manufacturing process information, process data related to each manufacturing process, and vision inspection result data, etc., but is not limited thereto.

When the display and a touch pad are configured as a touch screen in a layer structure, the display may be used as an input device in addition to as an output device. The display may include at least one of a liquid crystal display, a thin film transistor-liquid crystal display, an organic light-emitting diode display, a flexible display, a three-dimensional display, or an electrophoretic display. Also, the process management apparatus 1000 may include two or more displays depending on an implementation type of the process management apparatus 1000.

The sound output unit may output audio data received from the communication interface 1200 or stored in the memory 1100. Also, the sound output unit may output a sound signal related to functions (e.g., an abnormality signal detection notification, a defect occurrence notification, a message receiving sound, etc.) processed in the process management apparatus 1000. The sound output unit may include a speaker, a buzzer, etc.

The vibration motor may output the vibration signal. For example, the vibration motor may output the vibration signal corresponding to an output of audio data or video data (e.g., a call signal receiving sound, the message receiving sound, etc.) Also, the vibration motor may output the vibration signal when a touch is inputted to the touch screen.

The sensing unit 1600 may include at least one of a magnetism sensor, an acceleration sensor, an inclination sensor, an infrared ray sensor, a gyroscope sensor, a location sensor (e.g. global positioning system (GPS)), a temperature/humidity sensor, a proximity sensor, or an illuminance sensor, but is not limited thereto. Functions of respective sensors may be intuitively inferred and thus, detailed descriptions thereof will be omitted.

Figure 16:
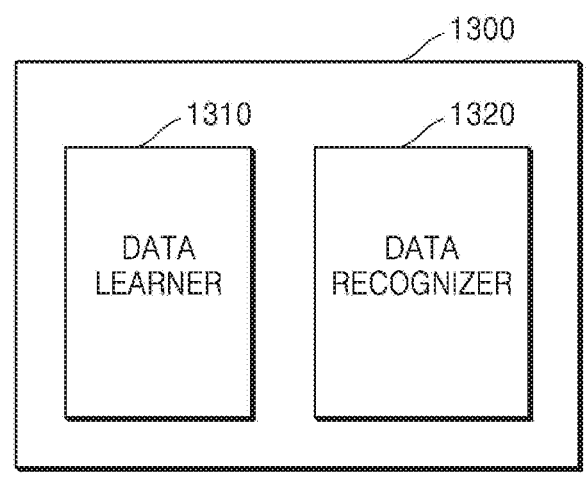
FIG. 16 is a block diagram of a processor according to an embodiment of the disclosure.

FIG. 16 is a block diagram of the processor 1300 according to an embodiment of the disclosure.

Referring to FIG. 16, the processor 1300 according to an embodiment of the disclosure may include a data learner 1310 and a data recognizer 1320.

The data learner 1310 may learn a reference for identifying an intensive inspection region (or an intensive inspection level). The data learner 1310 may learn the reference about what data to use for determining the intensive inspection region and how to determine a situation using the data. The data learner 1310 may obtain data (e.g., the vision inspection target information 301, the process information 302, the defect information 303, the defect rate information 304 according to the surrounding environment, and the like) to be used for learning, and apply the obtained data to a data recognition model to be described later, thereby learning the reference for determining the intensive inspection region (or the intensive inspection level).

For example, the data learner 1310 may learn defect images generated according to a material (e.g., glass, plastic, rubber, etc.) of an object. According to an embodiment, the data learner 1310 may learn defect images generated after each process. For example, the data learner 1310 may learn a defect image generated after a cutting process, a defect image generated after a thermoforming process, a defect image generated after a CNC process, and the like.

According to an embodiment, the data learner 1310 may also learn vision inspection result data. For example, the data learner 1310 may learn result data (e.g., basic inspection result data) obtained by performing vision inspection on an entire region at a basic inspection level, result data (e.g., intensive inspection result data) obtained by performing vision inspection on an intensive inspection region at a predetermined level, and the like.

The data recognizer 1320 may determine the intensive inspection region (or the intensive inspection level) based on the data. The data recognizer 1320 may identify the intensive inspection region (or the intensive inspection level) from the detected data by using a learned data recognition model. The data recognizer 1320 may obtain process data according to a predetermined reference by learning and use a data recognition model having the obtained process data as an input value, thereby determining the intensive inspection region (or the intensive inspection level) based on the process data. Further, a resultant value output by the data recognition model having obtained image data as an input value may be used to modify the data recognition model (e.g., the AI model 300).

At least one of the data learner 1310 and the data recognizer 1320 may be manufactured in the form of at least one hardware chip and mounted on the process management apparatus 1000. For example, at least one of the data learner 1310 and the data recognizer 1320 may be manufactured in the form of a dedicated hardware chip for AI or may be manufactured as a part of an existing general purpose processor (e.g. a computer processing unit (CPU) or an application processor) or a graphics-only processor (e.g., a graphics processing unit (GPU)) and mounted on the process management apparatus 1000.

In this case, the data learner 1310 and the data recognizer 1320 may be mounted on one process management apparatus 1000 or may be mounted on separate electronic apparatuses. For example, one of the data learner 1310 and the data recognizer 1320 may be included in the process management apparatus 1000, and the other may be included in the management server 2000. The data learner 1310 and the data recognizer 1320 may provide model information constructed by the data learner 1310 to the data recognizer 1320 by wired or wirelessly, and provide data input to the data recognizer 1320 to the data learner 1310 as additional learning data.

Meanwhile, at least one of the data learner 1310 and the data recognizer 1320 may be implemented as a software module. When the at least one of the data learner 1310 and the data recognizer 1320 is implemented as the software module (or a program module including an instruction), the software module may be stored in non-transitory computer readable media. Further, in this case, at least one software module may be provided by an operating system (OS) or by a predetermined application. Alternatively, one of the at least one software module may be provided by the OS, and the other one may be provided by the predetermined application.

Figure 17:
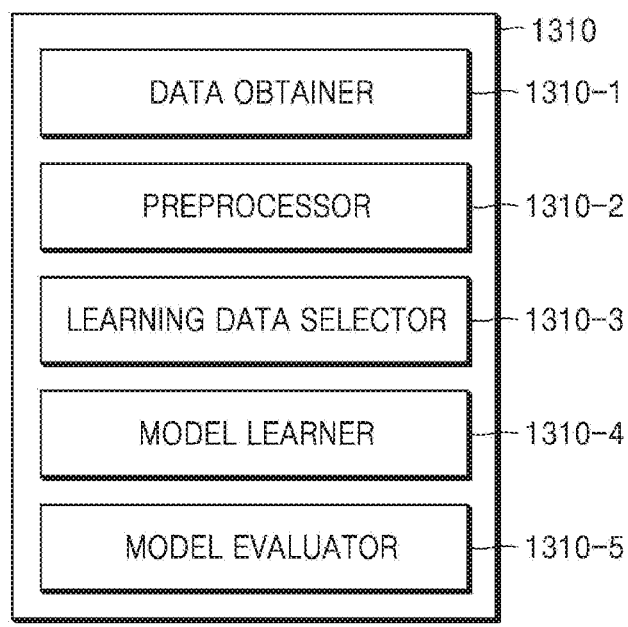
FIG. 17 is a block diagram of a data learner according to an embodiment of the disclosure.

FIG. 17 is a block diagram of the data learner 1310 according to an embodiment of the disclosure.

Referring to FIG. 17, the data learner 1310 according to an embodiment of the disclosure may include a data obtainer 1310-1, a preprocessor 1310-2, a learning data selector 1310-3, a model learner 1310-4 and a model evaluator 1310-5.

The data obtainer 1310-1 may obtain data necessary for determining an intensive inspection region (or an intensive inspection level). The data obtainer 1310-1 may obtain data (e.g., process data) necessary for learning for determining the intensive inspection region (or the intensive inspection level). According to an embodiment, the data obtainer 1310-1 may directly generate the data necessary for determining the intensive inspection region (or the intensive inspection level), or may receive the data necessary for determining the intensive inspection region (or the intensive inspection level) from an external apparatus or a server. For example, the data obtainer 1310-1 may directly collect information about a surrounding environment using sensors.

According to an embodiment, the data obtainer 1310-1 may obtain process data, surrounding environment data, image data, voice data, text data, and the like. For example, the data obtainer 1310-1 may receive the data through an input device (e.g., a microphone, a camera, a sensor, or the like) of the process management apparatus 1000. Alternatively, the data obtainer 1310-1 may obtain the data through an external device communicating with the process management apparatus 1000.

The preprocessor 1310-2 may pre-process the obtained data such that the obtained data may be used for learning for determining the intensive inspection region (or the intensive inspection level). The preprocessor 1310-2 may process the obtained data in a predetermined format such that the model learner 1310-4, which will be described later, may use the obtained data for learning for the situation determination.

For example, the preprocessor 1310-2 may overlap at least some of a plurality of images (or frames) constituting at least a part of an input moving image to generate a single composite image based on a common region included in each of the plurality of images. In this case, a plurality of composite images may be generated from one moving image. The common region may be a region including the same or similar common object (e.g., object, animal, plant, or person, etc.) in each of the plurality of images. Alternatively, the common region may be a region in which color, shade, an RGB value or a CMYK value is the same or similar in each of the plurality of images.

The learning data selector 1310-3 may select data necessary for learning from the preprocessed data. The selected data may be provided to the model learner 1310-4. The learning data selector 1310-3 may select the data necessary for learning from the preprocessed data according to a predetermined reference for determining the intensive inspection region (or the intensive inspection level). The learning data selector 1310-3 may also select the data according to a predetermined reference by learning by the model learner 1310-4, which will be described later. For example, the learning data selector 1310-3 may select image data including a photographing plan related to information of a subject and surrounding environment information of the subject.

The model learner 1310-4 may learn a reference as to how to determine a recommendation situation based on learning data. Also, the model learner 1310-4 may learn a reference as to which learning data is used to determine the recommendation situation.

Also, the model learner 1310-4 may learn a data recognition model used to determine the recommendation situation using the learning data. In this case, the data recognition model may be a previously constructed model. For example, the data recognition model may be a previously constructed model by receiving basic learning data (e.g., a sample image, etc.)

The data recognition model may be constructed in consideration of an application field of a recognition model, a purpose of learning, or the computer performance of an apparatus, etc. The data recognition model may be, for example, a model based on a neural network. For example, a model such as deep neural network (DNN), recurrent neural network (RNN), and bidirectional recurrent DNN (BRDNN) may be used as the data recognition model, but is not limited thereto.

According to various embodiments, when there are a plurality of data recognition models that are previously constructed, the model learner 1310-4 may determine a data recognition model having a high relation between input learning data and basic learning data as the data recognition model. In this case, the basic learning data may be previously classified according to data types, and the data recognition model may be previously constructed for each data type. For example, the basic learning data may be previously classified according to various references such as a region where the learning data is generated, a time at which the learning data is generated, a size of the learning data, a genre of the learning data, a creator of the learning data, a type of an object in the learning data, etc.

Also, the model learner 1310-4 may train the data recognition model using a learning algorithm including, for example, an error back-propagation method or a gradient descent method.

Also, the model learner 1310-4 may train the data recognition model through supervised learning using, for example, the learning data as an input value. Also, the model learner 1310-4 may train the data recognition model through unsupervised learning to find the reference for situation determination by learning a type of data necessary for situation determination for itself without any guidance. Also, the model learner 1310-4 may train the data recognition model, for example, through reinforcement learning using feedback on whether a result of situation determination based on the learning is correct.

Further, when the data recognition model is trained, the model learner 1310-4 may store the learned data recognition model. In this case, the model learner 1310-4 may store the trained data recognition model in the memory 1100 of the process management apparatus 1000 including the data recognizer 1320. Alternatively, the model learner 1310-4 may store the trained data recognition model in the memory 1100 of the process management apparatus 1000 including the data recognizer 1320 to be described later. Alternatively, the model learner 1310-4 may store the trained data recognition model in a memory of the management server 2000 connected to the process management apparatus 1000 over a wired or wireless network.

In this case, the memory in which the trained data recognition model is stored may also store, for example, a command or data related to at least one other component of the process management apparatus 1000. The memory may also store software and/or program. The program may include, for example, a kernel, middleware, an application programming interface (API), and/or an application program (or "application").

The model evaluator 1310-5 may input evaluation data to the data recognition model, and when a recognition result output from the evaluation data does not satisfy a predetermined reference, the model evaluator 1310-5 may allow the model learner 1310-4 to be trained again. In this case, the evaluation data may be predetermined data for evaluating the data recognition model.

For example, when the number or a ratio of evaluation data having an incorrect recognition result among recognition results of the trained data recognition model with respect to the evaluation data exceeds a predetermined threshold value, the model evaluator 1310-5 may evaluate that the data recognition model does not satisfy the predetermined reference. For example, when the predetermined reference is defined as a ratio of 2%, and when the trained data recognition model outputs an incorrect recognition result with respect to evaluation data exceeding 20 among a total of 1000 evaluation data, the model evaluator 1310-5 may evaluate that the trained data recognition model is not suitable.

On the other hand, when there are a plurality of trained data recognition models, the model evaluator 1310-5 may evaluate whether each of the trained motion recognition models satisfies the predetermined reference and determine a model satisfying the predetermined reference as a final data recognition model. In this case, when a plurality of models satisfy the predetermined reference, the model evaluator 1310-5 may determine any one or a predetermined number of models previously set in descending order of evaluation scores as the final data recognition model.

Meanwhile, at least one of the data obtainer 1310-1, the preprocessor 1310-2, the learning data selector 1310-3, the model learner 1310-4, or the model evaluator 1310-5 in the data learner 1310 may be manufactured in the form of at least one hardware chip and mounted on the process management apparatus 1000. For example, the at least one of the data obtainer 1310-1, the preprocessor 1310-2, the learning data selector 1310-3, the model learner 1310-4, or the model evaluator 1310-5 may be manufactured in the form of a dedicated hardware chip for AI or may be manufactured as a part of an existing general purpose processor (e.g. a CPU or an application processor) or a graphics-only processor (e.g., a GPU) and mounted on the process management apparatus 1000.

Also, the data obtainer 1310-1, the preprocessor 1310-2, the learning data selector 1310-3, the model learner 1310-4, and the model evaluator 1310-5 may be mounted on one process management apparatus 1000 or may be mounted on separate electronic apparatuses. For example, some of the data obtainer 1310-1, the preprocessor 1310-2, the learning data selector 1310-3, the model learner 1310-4, and the model evaluator 1310-5 may be included in the process management apparatus 1000, and the others may be included in the management server 2000.

Also, at least one of the data obtainer 1310-1, the preprocessor 1310-2, the learning data selector 1310-3, the model learner 1310-4, or the model evaluator 1310-5 may be implemented as a software module. When the at least one of the data obtainer 1310-1, the preprocessor 1310-2, the learning data selector 1310-3, the model learner 1310-4, or the model evaluator 1310-5 is implemented as the software module (or a program module including an instruction), the software module may be stored in non-transitory computer readable media. Further, in this case, at least one software module may be provided by an OS or by a predetermined application. Alternatively, one of the at least one software module may be provided by the OS, and the other one may be provided by the predetermined application.

Figure 18:
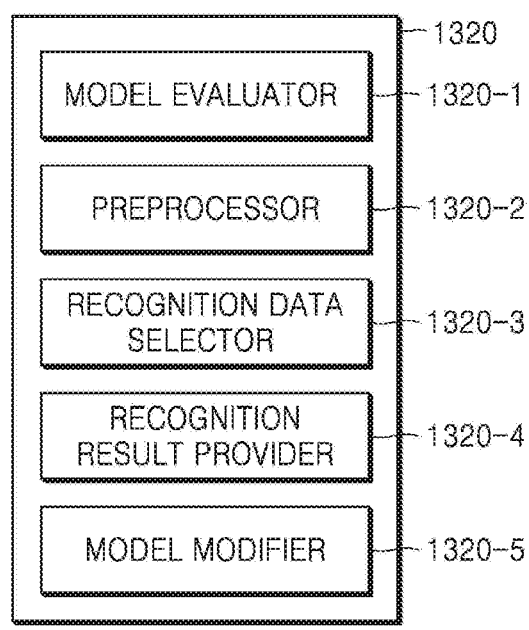
FIG. 18 is a block diagram of a data recognizer according to an embodiment of the disclosure.

FIG. 18 is a block diagram of the data recognizer 1320 according to an embodiment of the disclosure.

Referring to FIG. 18, the data recognizer 1320 according to an embodiment of the disclosure may include a data obtainer 1320-1, a preprocessor 1320-2, a recognition data selector 1320-3, a recognition result provider 1320-4 and a model modifier 1320-5.

The data obtainer 1320-1 may obtain data necessary for recommendation situation determination. The preprocessor 1320-2 may preprocess the obtained data such that the obtained data may be used for the recommendation situation determination. The preprocessor 1320-2 may process the obtained data to a predetermined format such that the recognition result provider 1320-4, which will be described later, may use the obtained data for the recommendation situation determination.

The recognition data selector 1320-3 may select data necessary for determining an intensive inspection region (or an intensive inspection level) from the preprocessed data. The selected data may be provided to the recognition result provider 1320-4. The recognition data selector 1320-3 may select some or all of the preprocessed data according to a predetermined reference for determining the intensive inspection region (or the intensive inspection level). The recognition data selector 1320-3 may also select data according to the predetermined reference by learning by the model learner 1310-4, which will be described later.

The recognition result provider 1320-4 may decide the determination of the intensive inspection region (or the intensive inspection level) by applying the selected data to a data recognition model. The recognition result provider 1320-4 may provide a recognition result according to a data recognition purpose. The recognition result provider 1320-4 may apply the selected data to the data recognition model by using the data selected by the recognition data selector 1320-3 as an input value. Also, the recognition result may be determined by the data recognition model.

For example, the recognition result of at least one image may be provided as text, voice, a moving image, an image or an instruction (e.g., an application execution instruction, a module function execution instruction, etc.). For example, the recognition result provider 1320-4 may provide the recognition result of an object included in the at least one image. The recognition result may include, for example, posture information of the object included in the at least one image, surrounding state information of the object, motion change information of an object included in the moving image, and the like.

The model modifier 1320-5 may modify the data recognition model based on evaluation of the recognition result provided by the recognition result provider 1320-4. For example, the model modifier 1320-5 may provide the model learner 1310-4 with the recognition result provided by the recognition result provider 1320-4 such that the model learner 1310-4 may modify the data recognition model.

Meanwhile, at least one of the data obtainer 1320-1, the preprocessor 1320-2, the recognition data selector 1320-3, the recognition result provider 1320-4, or the model modifier 1320-5 in the data recognizer 1320 may be manufactured in the form of at least one hardware chip and mounted on the process management apparatus 1000. For example, the at least one of the data obtainer 1320-1, the preprocessor 1320-2, the recognition data selector 1320-3, the recognition result provider 1320-4, or the model modifier 1320-5 may be manufactured in the form of a dedicated hardware chip for AI or may be manufactured as a part of an existing general purpose processor (e.g. a CPU or an application processor) or a graphics-only processor (e.g., a GPU) and mounted on the process management apparatus 1000.

Also, the data obtainer 1320-1, the preprocessor 1320-2, the recognition data selector 1320-3, the recognition result provider 1320-4, and the model modifier 1320-5 may be mounted on one process management apparatus 1000 or may be mounted on separate electronic apparatuses. For example, some of the data obtainer 1320-1, the preprocessor 1320-2, the recognition data selector 1320-3, the recognition result provider 1320-4, and the model modifier 1320-5 may be included in the process management apparatus 1000, and the others may be included in the management server 2000.

Also, at least one of the data obtainer 1320-1, the preprocessor 1320-2, the recognition data selector 1320-3, the recognition result provider 1320-4, or the model modifier 1320-5 may be implemented as a software module. When the at least one of the data obtainer 1320-1, the preprocessor 1320-2, the recognition data selector 1320-3, the recognition result provider 1320-4, or the model modifier 1320-5 is implemented as the software module (or a program module including an instruction), the software module may be stored in non-transitory computer readable media. Further, in this case, at least one software module may be provided by an OS or by a predetermined application. Alternatively, one of the at least one software module may be provided by the OS, and the other one may be provided by the predetermined application.

Figure 19:
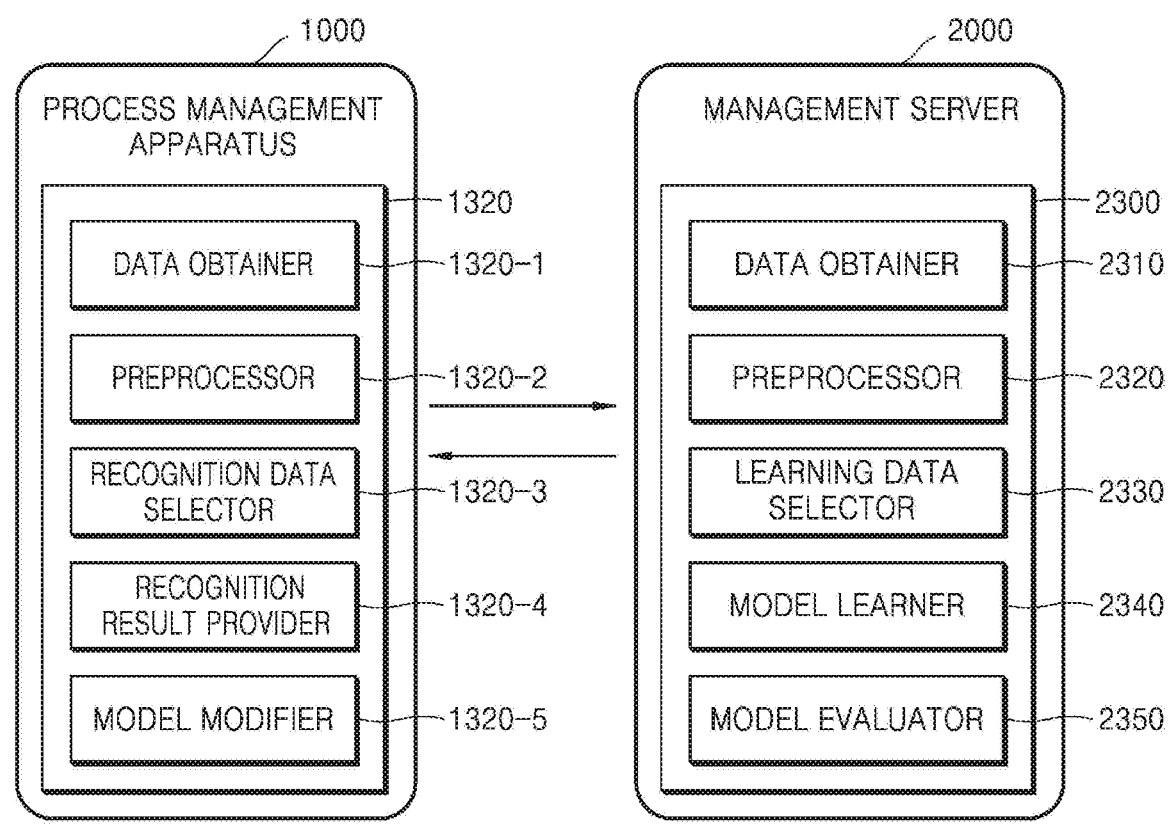
FIG. 19 is a diagram illustrating an example in which a process management apparatus and a management server learn and recognize data by interacting with each other, according to an embodiment of the disclosure.

FIG. 19 is a diagram illustrating an example in which the process management apparatus 1000 and the management server 2000 learn and recognize data by interacting with each other according to an embodiment of the disclosure.

Referring to FIG. 19, the management server 2000 may learn a reference for determining an intensive inspection region (or an intensive inspection level), and the process management apparatus 1000 may determine the intensive inspection region (or the intensive inspection level) based on learning result by the management server 2000. The management server 2000 includes a data recognizer 2300, a data obtainer 2310, preprocessor 2320, learning data selector 2330, a model learner 2340, and a model evaluator 2350.

In this case, the model learner 2340 of the management server 2000 may perform a function of the data learner 1310 shown in FIG. 17. The model learner 2340 of the management server 2000 may learn a reference as to which data to use to determine the intensive inspection region (or the intensive inspection level) and how to determine the intensive inspection region (or the intensive inspection level) using the data. The model learner 2340 may learn the reference for determining the intensive inspection region (or the intensive inspection level) by obtaining data to be used for learning and applying the obtained data to a data recognition model to be described later.

Also, the recognition result provider 1320-4 of the process management apparatus 1000 may determine the intensive inspection region (or the intensive inspection level) by applying data selected by the recognition data selector 1320-3 to the data recognition model generated by the management server 2000. For example, the recognition result provider 1320-4 may transmit the data selected by the recognition data selector 1320-3 to the management server 2000 and request the management server 2000 to apply the data selected by the recognition data selector 1320-3 to the data recognition model and determine the intensive inspection region (or the intensive inspection level). Further, the recognition result provider 1320-4 may receive information about a situation determined by the management server 2000 from the management server 2000.

Alternatively, the recognition result provider 1320-4 of the process management apparatus 1000 may receive the data recognition model generated by the management server 2000 from the management server 2000 to determine the intensive inspection region (or the intensive inspection level) using the received data recognition model. In this case, the recognition result provider 1320-4 of the process management apparatus 1000 may apply the data selected by the recognition data selector 1320-3 to the data recognition model received from the management server 2000 to determine the intensive inspection region (or the intensive inspection level).

A method according to an embodiment of the disclosure may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the disclosure or may be well-known to and be usable by one of ordinary skill in the art of computer software. Examples of the computer-readable recording medium include a magnetic medium such as a hard disk, a floppy disk, or a magnetic tape, an optical medium such as a compact disc read-only memory (CD-ROM) or a digital versatile disc (DVD), a magneto-optical medium such as a floptical disk, and a hardware device specially configured to store and execute program commands such as a ROM, a RAM, or a flash memory. Examples of the program commands are advanced language codes that may be executed by a computer by using an interpreter or the like as well as machine language codes made by a compiler.

Some embodiments may be implemented as a recording medium including computer-readable instructions such as a computer-executable program module. The computer-readable medium may be an arbitrary available medium accessible by a computer, and examples thereof include all volatile and non-volatile media and separable and non-separable media. Further, examples of the computer-readable medium may include a computer storage medium and a communication medium. Examples of the computer storage medium include all volatile and non-volatile media and separable and non-separable media, which are implemented by an arbitrary method or technology, for storing information such as computer-readable instructions, data structures, program modules, or other data. The communication medium typically includes computer-readable instructions, data structures, program modules, other data of a modulated data signal, or other transmission mechanisms, and examples thereof include an arbitrary information transmission medium. Also, some embodiments may be implemented as a computer program or a computer program product including computer-executable instructions such as a computer program executed by a computer.

It should be understood that embodiments described herein should be considered in a descriptive sense only and not for purposes of limitation. Descriptions of features or aspects within each embodiment should typically be considered as available for other similar features or aspects in other embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a process management apparatus, of managing vision inspection using an artificial intelligence (AI) model, the method comprising:
   obtaining first data related to a first manufacturing process for a first object which is performed by a first process equipment;
   identifying a first region having a high defect occurrence probability for the first manufacturing process in an entire region of the first object by inputting the first data to the AI model;
   controlling a first vision inspector to inspect the identified first region; and
   determining whether a defect is present in the identified first region.

2. The method of claim 1, further comprising:
   determining an inspection level with respect to the first region, based on the AI model and the first data.

3. The method of claim 2,
   wherein the controlling of the first vision inspector comprises:
   controlling the first vision inspector to perform a first vision inspection on the entire region of the first object at a first inspection level; and
   controlling the first vision inspector to perform a second vision inspection on the first region of the first object at a second inspection level, and wherein the second inspection level is higher than the first inspection level.

4. The method of claim 2, wherein the controlling of the first vision inspector comprises:
controlling the first vision inspector to obtain at least one of a two-dimensional (2D) image of the first region or a three-dimensional (3D) image of the first region according to the determined inspection level.

5. The method of claim 2, wherein the controlling of the first vision inspector comprises:
controlling the first vision inspector to obtain a low-resolution image of the first region or a high-resolution image of the first region, according to the determined inspection level.

6. The method of claim 1, further comprising:
obtaining second data related to a second manufacturing process when the first object passes through the second manufacturing process after the first manufacturing process;
determining a second region having a high defect occurrence probability for the first manufacturing process and the second manufacturing process in the entire region of the first object based on the first data and the second data; and
controlling a second vision inspector to inspect the determined second region for whether a defect is present.

7. The method of claim 3, further comprising:
obtaining first vision inspection result data with respect to the entire region of the first object and second vision inspection result data with respect to the first region of the first object, from the first vision inspector; and
modifying the AI model using the first data, the first vision inspection result data, and the second vision inspection result data.

8. The method of claim 7, further comprising:
obtaining third data related to the first manufacturing process when a second object of a same type as the first object passes through the first manufacturing process;
determining a third region having a high defect occurrence probability for the first manufacturing process in an entire region of the second object by inputting the third data to the modified AI model; and
controlling the first vision inspector to inspect the determined third region for whether a defect is present,
wherein the third region is different from the first region.

9. The method of claim 1, wherein the first data comprises one or more of:
information about the first process equipment for performing the first manufacturing process,
information about an operation part or content in the first manufacturing process,
information about an order of the first manufacturing process in an entire process,
information about a defect rate occurring in the first manufacturing process, and
context information generated in the first manufacturing process.

10. The method of claim 1, wherein the identifying of the first region comprises:
identifying the first region by further using at least one of information about a surrounding environment in which the first process equipment for performing the first manufacturing process operates or information about a material of the first object.

11. The method of claim 3, wherein the performing of the second vision inspection comprises:
when an abnormality signal with respect to an operation of the first object is detected during the first manufacturing process, controlling the first vision inspector to perform the second vision inspection on the first region at a third inspection level higher than the second inspection level.

12. A process management apparatus comprising:
a memory for storing an artificial intelligence (AI) model configured to determine an intensive inspection region having a high defect occurrence probability;
a communication interface configured to obtain first data related to a first manufacturing process for a first object which is performed by a first manufacturing process equipment; and
at least one processor configured to:
identify a first region having a high defect occurrence probability for the first manufacturing process in an entire region of the first object by inputting the first data to the AI model,
control a first vision inspector to inspect the identified first region, and
determine whether a defect is present in the identified first region.

13. The process management apparatus of claim 12, wherein the at least one processor is further configured to determine an inspection level with respect to the first region, based on the AI model and the first data.

14. The process management apparatus of claim 13, wherein the at least one processor is further configured to:
control the first vision inspector to perform a first vision inspection on the entire region of the first object at a first inspection level; and
perform a second vision inspection on the first region of the first object at a second inspection level,
wherein the second inspection level is higher than the first inspection level.

15. The process management apparatus of claim 13, wherein the inspection level comprises at least one of:
a level for analyzing a two-dimensional (2D) low-resolution image of the first region,
a level for analyzing a 2D high-resolution image of the first region,
a level for analyzing a three-dimensional (3D) low-resolution image of the first region, or
a level for analyzing a 3D high-resolution image of the first region.

16. The process management apparatus of claim 13, wherein the communication interface is further configured to obtain second data related to a second manufacturing process when the first object passes through the second manufacturing process after the first manufacturing process, and
wherein the processor is further configured to determine a second region having a high defect occurrence probability for the first manufacturing process and the second manufacturing process in the entire region of the first object and control a second vision inspector to inspect the second region for whether a defect is present.

17. The process management apparatus of claim 14, wherein the communication interface is further configured to obtain first vision inspection result data with respect to the entire region of the first object and second vision inspection result data with respect to the first region of the first object from the first vision inspector, and wherein the at least one processor is further configured to modify the AI model using the first data, the first vision inspection result data, and the second vision inspection result data.

18. The process management apparatus of claim 12, wherein the at least one processor is further configured to determine the first region by further using at least one of information about a surrounding environment in which the first manufacturing process equipment for performing the first manufacturing process operates or information about a material of the first object.

19. The process management apparatus of claim 14, wherein the at least one processor is further configured to, when an abnormality signal with respect to an operation of the first object is detected during the first manufacturing process, control the first vision inspector to perform the second vision inspection on the first region at a third inspection level higher than the second inspection level.

20. The process management apparatus of claim 12, wherein, the AI model is further configured to analyze the first data for information related to at least one of a cutting direction, a cutting position, or occurrence of an abnormal signal to determine the first region.

21. A computer program product comprising a non-transitory computer readable recording medium having recorded thereon a plurality of instructions that instruct at least one processor to perform:
    obtaining first data related to a first manufacturing process for a first object which is performed by a first process equipment;
    identifying a first region having a high defect occurrence probability for the first manufacturing process in an entire region of the first object by inputting the first data to an artificial intelligence (AI) model;
    controlling a first vision inspector to inspect the identified first region; and
    determining whether a defect is present in the identified first region.

\* \* \* \* \*